US012775609B2

(12) United States Patent
Shepherd et al.

(10) Patent No.: US 12,775,609 B2
(45) Date of Patent: Oct. 27, 2026

(54) SYSTEMS AND METHODS FOR DATA RECONCILIATION USING A LEDGER ARCHITECTURE

(71) Applicant: Wells Fargo Bank, N.A., San Francisco, CA (US)

(72) Inventors: Matthew Mullin Shepherd, Charlotte, NC (US); Nathaniel C. Eutsler, San Francisco, CA (US); Piers Varley, San Francisco, CA (US); Oleg Terletsky, San Francisco, CA (US)

( * ) Notice: Subject to any disclaimer, the term of this patent is extended or adjusted under 35 U.S.C. 154(b) by 0 days.

(21) Appl. No.: 18/802,803

(22) Filed: Aug. 13, 2024

(65) Prior Publication Data

US 2026/0050587 A1 Feb. 19, 2026

(51) Int. Cl.

*G06F 16/00* (2019.01)
*G06F 16/23* (2019.01)
*G06Q 20/40* (2012.01)

(52) U.S. Cl.

CPC ....... *G06F 16/2358* (2019.01); *G06Q 20/401* (2013.01); *G06Q 2220/00* (2013.01)

(58) Field of Classification Search

None
See application file for complete search history.

(56) References Cited

U.S. PATENT DOCUMENTS

| | | | | |
|---|---|---|---|---|
| 9,432,192 | B1 * | 8/2016 | Pogde | H04L 9/0836 |
| 9,996,528 | B2 * | 6/2018 | Gidney | G06F 40/30 |
| 10,108,812 | B2 * | 10/2018 | Ansari | G06F 21/645 |
| 10,445,698 | B2 * | 10/2019 | Hunn | G06F 16/219 |
| 10,643,288 | B2 * | 5/2020 | Orsini | H04L 63/12 |
| 10,812,274 | B2 * | 10/2020 | Back | G06Q 20/401 |
| 11,568,505 | B2 * | 1/2023 | Hunn | G06Q 20/223 |
| 11,682,053 | B2 * | 6/2023 | Tietzen | G06Q 30/0279 705/329 |
| 12,148,012 | B2 * | 11/2024 | Tietzen | G06Q 30/0279 |
| 12,412,120 | B2 * | 9/2025 | Cella | G06F 18/23 |
| 2013/0019095 | A1 * | 1/2013 | Cohen | G06Q 20/00 713/164 |
| 2014/0188715 | A1 * | 7/2014 | Barlok | G06Q 20/102 705/40 |
| 2016/0026620 | A1 * | 1/2016 | Gidney | G06F 40/30 705/311 |
| 2016/0063049 | A1 * | 3/2016 | Vijayasekaran | G06F 16/2365 707/694 |

(Continued)

*Primary Examiner* — Jean M Corrielus
(74) *Attorney, Agent, or Firm* — Foley & Lardner LLP

(57) ABSTRACT

Various systems and methods are disclosed relating to protecting cross-system exchanges. A data processing system includes one or more processing circuits configured to identify a plurality of data elements and generate a first plurality of cryptographic objects. The one or more processing circuits are further configured to record the first plurality of cryptographic objects on a distributed ledger and generate metadata corresponding to at least one of the plurality of data elements, the metadata including temporal data. The one or more processing circuits are further configured to generate a bi-temporal record including a plurality of links to the plurality of data elements and storing the corresponding metadata. The one or more processing circuits are further configured to provide an interface including a query element corresponding to the bi-temporal record.

20 Claims, 4 Drawing Sheets

(56) References Cited

U.S. PATENT DOCUMENTS

| | | | | |
|---|---|---|---|---|
| 2016/0098723 | A1* | 4/2016 | Feeney | G06Q 20/065 705/75 |
| 2016/0330034 | A1* | 11/2016 | Back | G06Q 20/065 |
| 2017/0177898 | A1* | 6/2017 | Dillenberger | G06F 16/2379 |
| 2017/0373859 | A1* | 12/2017 | Shors | H04L 9/3247 |
| 2019/0122317 | A1* | 4/2019 | Hunn | G06Q 20/223 |
| 2019/0392489 | A1* | 12/2019 | Tietzen | G06Q 30/0279 |
| 2020/0065301 | A1* | 2/2020 | Funke | G06F 16/2379 |
| 2020/0177373 | A1* | 6/2020 | Komandur | H04L 9/3247 |
| 2020/0226292 | A1* | 7/2020 | Feist | G06F 21/602 |
| 2020/0267178 | A1* | 8/2020 | Maor | H04L 63/1425 |
| 2020/0366505 | A1* | 11/2020 | Feng | H04L 9/3239 |
| 2021/0150477 | A1* | 5/2021 | Shrinivasan | G06F 16/27 |
| 2021/0166245 | A1* | 6/2021 | Novotny | H04L 67/1078 |
| 2021/0224806 | A1* | 7/2021 | Gupta | G06F 21/6218 |
| 2021/0256442 | A1* | 8/2021 | Jagmohan | G06Q 10/06315 |
| 2021/0342836 | A1* | 11/2021 | Cella | G06F 18/23 |
| 2022/0103453 | A1* | 3/2022 | Novotny | H04L 41/28 |
| 2022/0172206 | A1* | 6/2022 | Cella | G06F 18/23 |
| 2022/0172207 | A1* | 6/2022 | Cella | G06F 18/23 |
| 2022/0172208 | A1* | 6/2022 | Cella | G06F 18/23 |
| 2022/0366494 | A1* | 11/2022 | Cella | G06N 3/006 |
| 2023/0162304 | A1* | 5/2023 | Hunn | H04L 9/3247 707/798 |
| 2024/0078577 | A1* | 3/2024 | Tietzen | G06Q 30/0279 |
| 2024/0176896 | A1* | 5/2024 | Sanghvi | H04L 9/0825 |
| 2026/0030661 | A1* | 1/2026 | Tietzen | G06Q 30/0279 |

* cited by examiner

SYSTEMS AND METHODS FOR DATA RECONCILIATION USING A LEDGER ARCHITECTURE

TECHNICAL FIELD

The present implementations relate generally to cryptographic systems, and more particularly to the reconciliation and synchronization of cryptographic objects and data elements across multiple systems of records using distributed ledger technologies. Additionally, the present implementations pertain to the integration of records and secure data verification mechanisms across decentralized networks.

BACKGROUND

In digital ecosystems, entities such as regulatory bodies, financial institutions, and data-driven platforms perform numerous operations that span various systems of records (SORs). These operations often involve data elements, records, and metrics that necessitate accurate tracking and reconciliation. As the complexity and volume of data expand, ensuring the integrity, security, and real-time (or near real-time) synchronization of objects and data elements across multiple SORs becomes important. Traditional data management methodologies can be error-prone and inefficient in addressing the demands of large-scale data reconciliation and verification. Consequently, there is an increasing need for cryptographic systems that facilitate data protection and monitoring across multiple systems and ledgers, thereby enhancing data integrity, operational efficiency, and overall security within networks.

SUMMARY

Some implementations relate to a system to protect cross-system exchanges. The system can include a data processing system including one or more processing circuits comprising one or more processors and one or more memory devices, the data processing system configured to identify a plurality of data elements associated with an exchange across a plurality of data sources corresponding to a plurality of entities. The data processing system can be further configured to generate a first plurality of cryptographic objects of at least one of the plurality of data elements. In some implementations, at least one of the first plurality of cryptographic objects corresponding to a first identifier representing a first state of at least one of the plurality of data elements at a first capture time. The data processing system can be further configured to record at least one of the first plurality of cryptographic objects on a distributed ledger. The data processing system can be further configured to generate metadata corresponding to at least one of the plurality of data elements. In some implementations, the metadata including temporal data including the first capture time corresponding to when at least one of the plurality of data elements was captured, and identifying data including origin information of the plurality of data sources. The data processing system can be further configured to generate a bi-temporal record including (i) a plurality of links to the plurality of data elements and (ii) storing the corresponding metadata. In some implementations, the bi-temporal record corresponding to an exchange time and a validity time for at least one of the plurality of data elements. The data processing system can be further configured to track updates to the plurality of data elements based on updating the bi-temporal record, using at least one control structure, with one or more new cryptographic objects and new metadata based on an update to at least one of the plurality of data elements of the exchange. The data processing system can be further configured to provide an interface including a query element corresponding to the bi-temporal record. In some implementations, the query element configured to, responsive to receiving an interaction, verify the plurality of data elements using the at least one control structure based on retrieving the first plurality of cryptographic objects or the one or more new cryptographic objects from the distributed ledger, generating a second plurality of cryptographic objects corresponding to a second identifier representing a second state of at least one of the plurality of data elements at a second capture time, and verifying the first state of plurality of cryptographic objects or a new state of the one or more new cryptographic objects corresponds to the second state of second plurality of cryptographic objects.

Some implementations relate to a method to protect cross-system exchanges. The method can include identifying, by one or more processing circuits, a plurality of data elements associated with an exchange across a plurality of data sources corresponding to a plurality of entities. The method can further include generating, by the one or more processing circuits, a first plurality of cryptographic objects of at least one of the plurality of data elements. In some implementations, at least one of the first plurality of cryptographic objects corresponding to a first identifier representing a first state of at least one of the plurality of data elements at a first capture time. The method can further include recording, by the one or more processing circuits. In some implementations, at least one of the first plurality of cryptographic objects on a distributed ledger. The method can further include generating, by the one or more processing circuits, metadata corresponding to at least one of the plurality of data elements. In some implementations, the metadata including temporal data including the first capture time corresponding to when at least one of the plurality of data elements was captured, and identifying data including origin information of the plurality of data sources. The method can further include generating, by the one or more processing circuits, a bi-temporal record including (i) a plurality of links to the plurality of data elements and (ii) storing the corresponding metadata. In some implementations, the bi-temporal record corresponding to an exchange time and a validity time for at least one of the plurality of data elements. The method can further include tracking, by the one or more processing circuits, updates to the plurality of data elements based on updating the bi-temporal record, using at least one control structure, with one or more new cryptographic objects and new metadata based on an update to at least one of the plurality of data elements of the exchange. The method can further include providing, by the one or more processing circuits, an interface including a query element corresponding to the bi-temporal record. In some implementations, the query element configured to, responsive to receiving an interaction, verify the plurality of data elements using the at least one control structure based on retrieving the first plurality of cryptographic objects or the one or more new cryptographic objects from the distributed ledger, generating a second plurality of cryptographic objects corresponding to a second identifier representing a second state of at least one of the plurality of data elements at a second capture time, and verifying the first state of plurality of cryptographic objects or a new state of the one or more new cryptographic objects corresponds to the second state of second plurality of cryptographic objects.

Some implementations relate to a system to protect cross-system exchanges. The system can include a data processing system including memory and one or more processing circuits configured to identify a data element associated with an exchange from a data source corresponding to an entity. The one or more processing circuits can be further configured to generate a first cryptographic object of the data element. In some implementations, the first cryptographic object corresponding to a first identifier representing a first state of the data element at a first capture time. The one or more processing circuits can be further configured to record the first cryptographic object on a distributed ledger. The one or more processing circuits can be further configured to generate metadata corresponding to the data element. In some implementations, the metadata including temporal data indicating the first capture time and identifying data including origin information of the data source. The one or more processing circuits can be further configured to generate or update a bi-temporal record including (i) a link to the data element and (ii) storing the corresponding metadata. In some implementations, the bi-temporal record corresponding to an exchange time and a validity time for the data element. The one or more processing circuits can be further configured to track updates to the data element based on updating the bi-temporal record, using at least one control structure, with a new cryptographic object and new metadata based on an update to the data element. The one or more processing circuits can be further configured to provide an interface including a query element corresponding to the bi-temporal record. In some implementations, the query element configured to, responsive to receiving an interaction, verify the data element using the at least one control structure by retrieving the new cryptographic object corresponding to a new identifier from the distributed ledger, generating a second cryptographic object corresponding to a second identifier representing a second state of the data element at a second capture time, verifying a new state of the new cryptographic object corresponds to the second state of the second cryptographic object.

Numerous specific details are provided to impart a thorough understanding of implementations of the subject matter of the present disclosure. The described features of the subject matter of the present disclosure can be combined in any suitable manner in one or more embodiments and/or implementations. In this regard, one or more features of an aspect of the implementations can be combined with one or more features of a different aspect of the implementations. Moreover, additional features can be recognized in certain embodiments and/or implementations that cannot be present in all embodiments or implementations.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers indicate identical, functionally similar, and/or structurally similar elements.

Figure 1:
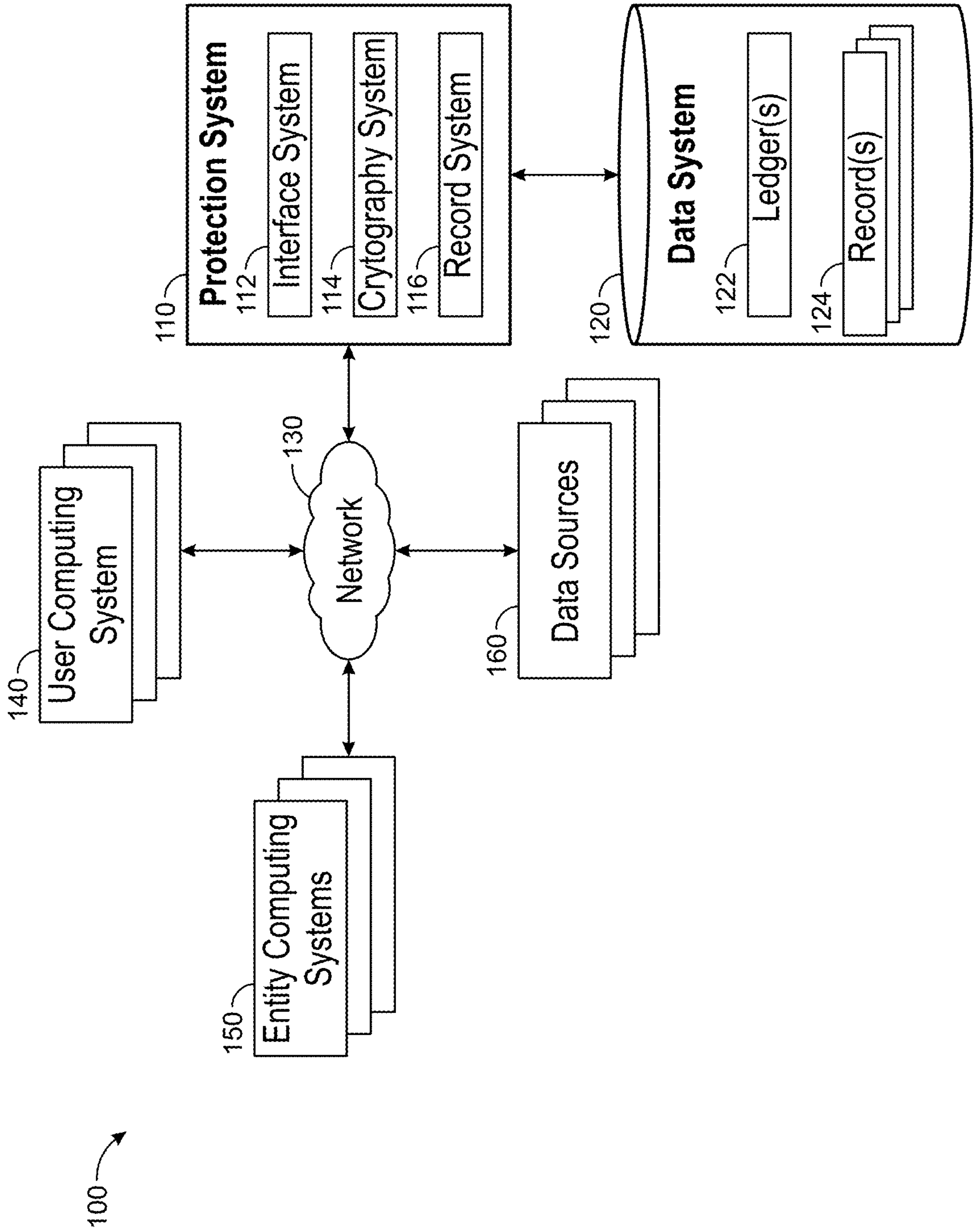
FIG. 1 depicts an example system, according to some implementations.

It will be recognized that some or all of the FIGS. are schematic representations for purposes of illustration. The FIGS. are provided for the purpose of illustrating one or more implementations with the explicit understanding that they will not be used to limited the scope of the meaning the claims.

DETAILED DESCRIPTION

The present implementations will now be described in detail with reference to the drawings, which are provided as illustrative examples of the implementations so as to enable those skilled in the art to practice the implementations and alternatives apparent to those skilled in the art. Notably, the Figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, any term in the specification or claims should not be ascribed an uncommon or special meaning unless explicitly set forth as such. Further, the present implementations encompass present and future known equivalents to the known components referred to herein by way of illustration.

This disclosure relates to systems, computer-readable media, and methods for reconciling transaction data across multiple systems of record for accurate record keeping using a distributed ledger technology (DLT) architecture. As described herein, the disclosed systems and methods can identify, hash, and synchronize data elements from multiple sources, providing secure and verifiable records of transactions. The technological improvements can include, for example, the implementations of cryptographic hashing (or using other cryptographic outputs) and bi-temporal record to monitor and verify the integrity of transaction data dynamically, improving consistency and accuracy across disparate systems.

Typically, transaction management processes involve multiple systems of record (SORs) that operate independently, leading to inconsistencies and difficulties in ensuring data integrity over time. These processes are particularly inefficient at large scales where transactions need to be accurately tracked across different departments or entities. Manual approaches also generally lack real-time monitoring and error detection capabilities, making them unsuitable for today's complex financial environments. In response, some systems employ centralized databases, which can create single points of failure and bottlenecks. That is, traditional systems facilitate the storage and retrieval of transaction data within isolated systems, leading to potential discrepancies and inefficiencies. This indirect approach can lead to delays in reconciliation, dependency on manual oversight, and increased risk of data tampering and fraud.

The DLT-based systems and methods described herein, in contrast, provide secure and verifiable data reconciliation across distributed ledgers, thereby eliminating the need for centralized databases and the associated inefficiencies. By using cryptographic hashing and bi-temporal records that automatically update based on predefined conditions such as transaction completion or data modification, the systems and methods can ensure the integrity and accuracy of the transaction data in real-time or near real-time. Additionally, to address the technical problems, the described systems and methods employ an improved DLT-based approach that integrates cryptographic hashing for automating data verification. These cryptographic hashes are designed to update automatically when predefined conditions, such as data modifications or time-based triggers, are met. This implementation improves efficiency by minimizing manual interventions and errors, providing secure and verifiable records across various systems of record.

In some implementations, the bi-temporal record can be configured as either bi-temporal or uni-temporal through the use of a control structure, such as a smart contract, to protect the immutability of records and data elements across different ledgers. For example, the control structure can enforce conditions that govern the recording and maintenance of data elements and the corresponding timestamps on the ledgers, ensuring that the relationships between the data elements and their temporal attributes remain immutable and time-sensitive. That is, the bi-temporal record can capture both the transaction time and the validity time of each data element, providing an audit trail that reflects the updates of data across multiple systems of record. In some implementations, the uni-temporal record may capture only a single temporal dimension, such as the transaction time, while still benefiting from the immutability and security provided by the DLT architecture.

The described technical improvement to verify and update transaction data upon satisfying the predefined conditions provides a technical advantage by improving the speed and efficiency of data reconciliation. It also reduces operational overhead and enhances data integrity, ensuring accurate and consistent records across multiple systems. Furthermore, by maintaining an immutable record of transactions on the distributed ledger, the systems and methods provide improved auditability and compliance, aspects that are less efficiently handled by traditional centralized systems. Moreover, the architecture supports improved monitoring and auditing capabilities, providing real-time tracking of transactions and their updates. Furthermore, the systems and methods described herein can dynamically handle multiple types of data elements through a unified platform, reducing the complexity and computational overhead associated with traditional transaction management processes. These and other features and benefits are described more fully herein below.

Referring now to FIG. 1, a block diagram depicting an example of a computing environment 100 with a protection system 110 is shown, according to some implementations. As shown, the computing environment 100 includes the protection system 110, a data system 120, a network 130, one or more user computing system(s) 140, and one or more entity computing system(s) 150. The protection system 110 can include an interface system 112, a cryptography system 114, and a record system 116. The protection system 110 can include or, as shown, be communicatively coupled or linked to the data system 120, and the data system 120 can include a ledger 122 and records 124. Although the various computing elements of FIG. 1 can be described in the singular form below (e.g., network 130, user computing system 140, etc.), it should be understood that the computing environment 100 can include two or more of any device/system described herein (e.g., two or more network(s) 130, two or more user computing system(s) 140, etc.).

In general, protection system 110 can be configured or structured to manage and reconcile exchange data across multiple systems of records (SORs) to ensure accurate and secure record keeping. In some implementations, protection system 110 operates by storing data both on-chain and off-chain, with part of the record hashed and stored on a distributed ledger. When the data is hashed, it can be checked for tampering or changes. For example, in a capital markets transaction, a trading system captures the risk elements associated with the transaction. These risk elements can be recorded at the point of capture and hashed to create a cryptographic object that is stored on the ledger (e.g., ledger 122). The hashed data can then be used to verify the integrity of the transaction at any point in time, allowing systems to verify the creation and validity of the record.

In some implementations, protection system 110 can integrate with various transaction systems (e.g., regulatory reporting systems) to feed back the hashes to the original SORs, thereby linking all related SORs. As the exchange progresses through different stages, additional data can be appended to the transaction record (e.g., bi-temporal record), allowing the transaction to be tracked over time. For example, the trade can change in time based on some of the reference trade data being used. In that way, a system can analyze the progress of the exchange. At a different point in time, a different organization can be facilitate the trade. That is, protection system 110 can control who is allowed to update it, and who owns the transaction at any point in time. Protection system 110 can block certain organizations from updating the trade and track where the trade is—front office, operations, etc.

In some implementations, the control structure, such as a smart contract, can be deployed and implemented to enforce the rules and conditions governing (e.g., ownership parameters or ledger parameters) interactions between various ledgers and systems of record (SORs). For example, the control structure can authenticate data elements before they are recorded on the ledgers. The control structure can also manage the temporal properties of data elements, determining whether they should be recorded as bi-temporal or uni-temporal based on transaction-specific criteria. Additionally, the control structure can automate data exchange processes between ledgers and SORs.

In some implementations, protection system 110 can utilize hashing of individual pieces of an exchange and distribute those pieces to multiple separate blockchains to facilitate transactions across the multiple separate blockchains. For example, each SOR can have its own blockchain, and the individual hashes can be stored on these separate chains. Additionally, protection system 110 links the individual pieces back to the original SOR for central monitoring of the transaction (e.g., in the bi-temporal record), and appends point-in-time data to track the transaction over time.

In various implementations, components of the computing environment 100 communicate over network 130. Network 130 can include computer networks such as the Internet, local, wide, metro or other area networks, intranets, satellite networks, other computer networks such as voice or data mobile phone communication networks, combinations thereof, or any other type of electronic communications network. Network 130 can include or constitute a display network. In various implementations, network 130 facilitates secure communication between components of computing environment 100. As a non-limiting example, network 130 can implement transport layer security (TLS), secure sockets layer (SSL), hypertext transfer protocol secure (HTTPS), and/or any other secure communication protocol.

In some implementations, network 130 can be composed of various network devices (nodes) communicatively linked to form one or more data communication paths between participating devices. The network 130 can facilitate communication between the various nodes, such as the protection system 110, data system 120, one or more user computing system(s) 140, and one or more entity computing system(s) 150 (e.g., using an OSI layer-4 transport protocol such as the User Datagram Protocol (UDP), the Transmission Control Protocol (TCP), Stream Control Transmission Protocol (SCTP), etc.). Each networked device can include at least one network interface for receiving and/or transmitting data, typically as one or more data packets. An illustrative network 130 can the Internet; however, other networks can be used. Network 130 can be an autonomous system (AS), i.e., a network that can operated under a consistent unified routing policy (or at least appears to from outside the AS network) and can generally be managed by a single administrative entity (e.g., a system operator, administrator, or administrative group).

The protection system 110 can be owned by, or otherwise associated with, a provider institution or an organization that provides services to users and entities and facilitates exchanges. In one embodiment and as shown, the protection system 110 can be configured to secure and manage data elements from multiple sources. The protection system 110 can identify data elements from multiple sources, process these elements, generate cryptographic objects, and maintain records of these elements and objects. For example, the protection system 110 can identify data elements from sources such as trading platforms, banks, and regulatory authorities, generate cryptographic objects for these elements, and store them in one or more ledgers.

In the example shown, the protection system 110 includes a plurality of sub-processing systems, shown as the interface system 112, cryptography system 114, and record system 116 for processing, securing, and recording data elements. In some implementations, the protection system 110 and/or included sub-systems (e.g., interface system 112, cryptography system 114, etc.) can include at least one processing system or device, such as a computing device having at least one processing circuit configured to execute instructions stored in a memory device to perform one or more operations described herein. The processing circuit can include a processor, such as a microprocessor, an application-specific integrated circuit (ASIC), a field-programmable gate array (FPGA), etc., or combinations thereof. The processing circuit can include a memory, and the memory can include, but is not limited to, electronic, optical, magnetic, or any other storage or transmission device capable of providing processor(s) with program instructions. The instructions can include code from any suitable computer programming language such as, but not limited to, ActionScript®, C, C++, C #, HTML, Java®, JavaScript®, Perl®, Python®, Visual Basic®, and XML.

Figure 2:
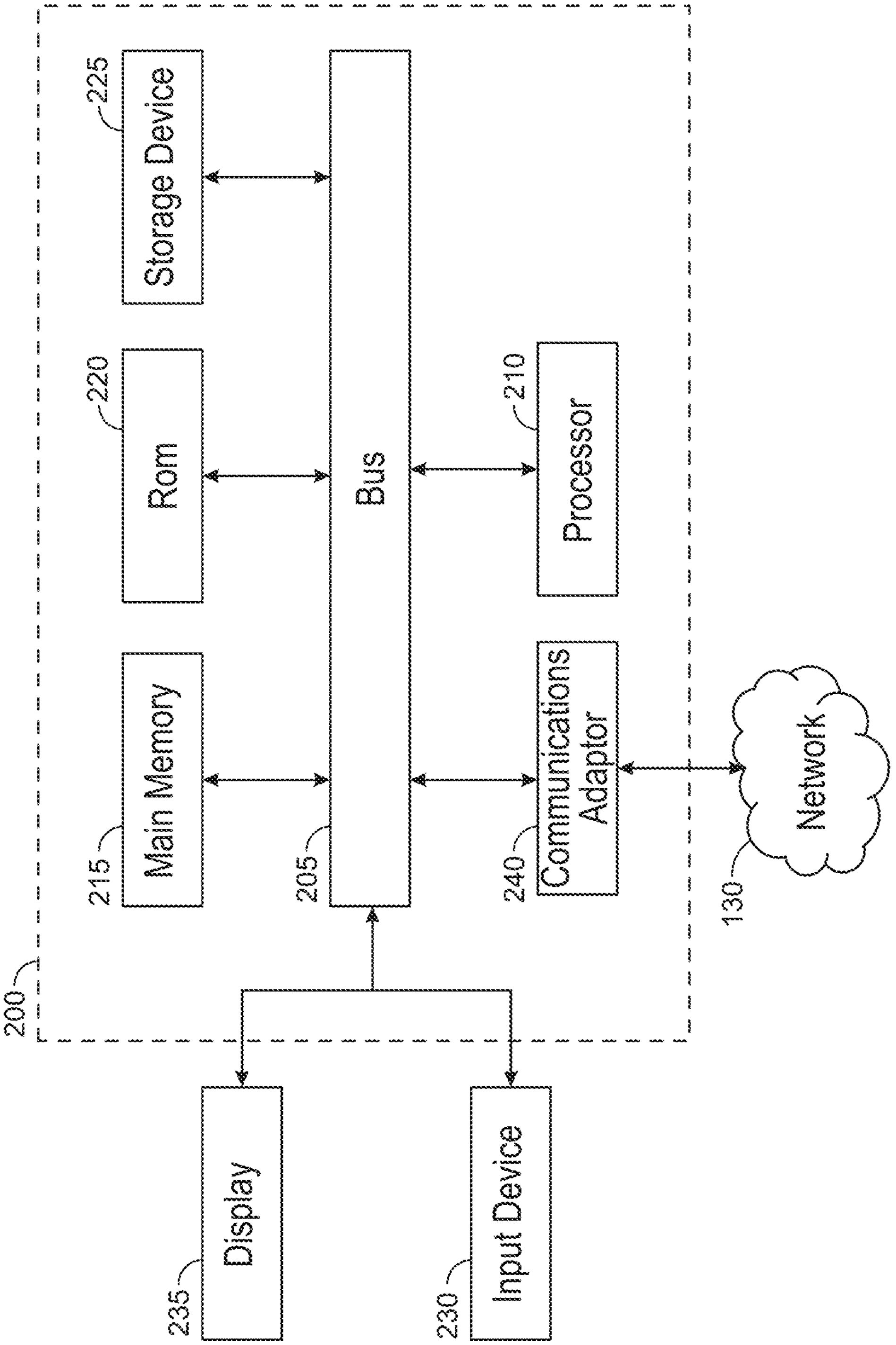
FIG. 2 depicts a block diagram illustrating an example computing system for use in the various implementations described herein.

In some implementations, the protection system 110, data system 120, user computing system 140, and/or entity computing systems 150 (e.g., SORs) can include the structural components of the computing device described in FIG. 2, which can be used to run or otherwise implement the various functionalities and/or features described herein, such as securing and managing data elements. In other implementations, the protection system 110 can be a server, distributed processing cluster, cloud processing system, or any other computing device or system. The protection system 110 can include or execute at least one computer program or at least one script. In some implementations, protection system 110 includes combinations of software and hardware, such as one or more processors configured to execute one or more scripts. For example, the protection system 110 can include one or more processing circuits (e.g., a processing circuit) including a processor and memory, and the memory can have instructions stored thereon that, when executed by the processor, cause the processing circuit to perform the various operations described herein. The operations described herein can be implemented using software, hardware, or a combination thereof. As mentioned above and herein, the processor(s) included in the processing circuit(s) of the protection system 110 can include a microprocessor, ASIC, FPGA, etc., or combinations thereof, or can include a multi-core processor or an array of processors. The memory included in the processing circuit of the protection system 110 can include, but is not limited to, electronic, optical, magnetic, or any other storage devices capable of providing a processor or processing circuit with program instructions. For example, the memory can include a floppy disk, CD-ROM, DVD, magnetic disk, memory chip, ROM, RAM, EEPROM, EPROM, flash memory, optical media, or any other suitable memory from which processor(s) can read instructions.

In some implementations, in addition to the processing circuit(s), the protection system 110 can include and/or be communicatively coupled to one or more databases (e.g., data system 120). The databases can be structured as a data repository that can configured to store data elements, cryptographic objects, bi-temporal records, and metadata. For example, the data system 120 can include data structures for storing information such as, but not limited to, data elements (e.g., transaction records, compliance certificates, financial details), cryptographic objects (e.g., cryptographic hashes, digital signatures, encrypted tokens), bi-temporal records (e.g., records of data states at different times, historical transaction logs, versioned compliance data, or any data structure or data package configured to track changes over time), and metadata (e.g., timestamps, source identifiers). The data system 120 can be part of the protection system 110, or a separate component that the protection system 110 and/or the user computing system 140 can access via the network 130. The data system 120 can also be distributed throughout the computing environment 100. For example, the data system 120 can include multiple databases associated with the protection system 110, a client device (e.g., user computing system 140), or both. The data system 120 can include one or more storage mediums. The storage mediums can include, but are not limited to, magnetic storage, optical storage, flash storage, and/or RAM. In some implementations, the protection system 110 can implement or facilitate various APIs to perform database functions (i.e., managing, synchronizing, or linking data stored in the data system 120). The APIs can be, but are not limited to, SQL, ODBC, JDBC, NOSQL and/or any other data storage and manipulation API.

In some implementations, the data system 120 can include one or more ledgers 122 and records 124. The ledger 122 can include data structures for storing transactions, such as blocks in a blockchain. For example, the ledger 122 can include blocks such as block n−1, block n, and block n+1, which store transactions. Each block can contain multiple transactions. For example, block n includes transaction #1, transaction #2, and transaction #3. The cryptography system 114 can compile multiple cryptographic objects and bundle them into a block. For example, the cryptography system 114 can use a consensus algorithm to validate and add the block to the ledger 122. The records 124 can include data elements such as cryptographic objects, bi-temporal records, metadata, and other related information. The records 124 can be updated by the record system 116 to reflect changes and updates to the data elements over time.

In some implementations, one or more ledgers 122 can store smart contracts. For example, a smart contract can be encoded directly into the blockchain within the ledger 122, with each smart contract corresponding to specific transactions or data elements. The smart contract can execute predefined conditions automatically. For example, a smart contract can be triggered to validate the authenticity of a data element, execute a transaction when a specific condition is met, or manage access permissions for different entities involved in the transaction. In another example, a smart contract stored on ledger 122 can automatically transfer funds once the required validation is complete.

In some implementations, protection system 110 can generate control structures, such as smart contracts, based on predefined conditions associated with specific data elements or transactions. For example, when protection system 110 identifies data elements related to an exchange, a control structure can be generated to manage the rules and conditions governing the transaction. The control structure can define validation parameters, data synchronization requirements, and access controls. The control structure can be stored across multiple ledgers 122, each associated with a distinct system of record (SOR). Each ledger 122 can store a copy of the control structure, ensuring that the rules are applied consistently across all SORs involved in the transaction. The cryptographic objects generated during the transaction can recorded on the respective ledgers 122, linked to the control structure, and validated against the conditions defined by the control structure. In some implementations, the control structure can operate to enforce transaction conditions across the ledgers 122. When specific triggers are detected, such as data validation or changes in data elements, the control structure executes the corresponding actions, such as updating bi-temporal records or generating new cryptographic objects. The control structure also enforces security protocols, restricting modifications to the transaction data to authorized entities only.

In some implementations, protection system 110 can identify the control structure for updating the bi-temporal record by analyzing metadata associated with the data element. The metadata can include information such as the data element type, the source of the update request, and the specific ledger 122 where the data element's cryptographic object is stored. Protection system 110 can utilize predefined logic stored within its processing circuits to determine which control structure to apply based on specific criteria. The criteria can include the type of data element, the ledger it resides on, and the identity and role of the entity initiating the update. The logic is encoded in rules or smart contracts stored within the system's secure configuration files or databases. For example, if the data element pertains to a high-risk transaction, the logic may dictate the use of a control structure that enforces multi-signature verification before any update is allowed.

In some implementations, once the appropriate control structure is identified, protection system 110 retrieves the smart contract from the ledger 122 (or another storage). For example, the protection system 110 can reference the metadata associated with the data element, which can include a unique identifier, such as a hash or transaction ID, linked to the specific smart contract stored on the ledger. Protection system 110 can issue a query to the corresponding ledger 122 using this identifier. The query can be executed through an API or smart contract interface, facilitating interactions between protection system 110 and the blockchain. The protection system 110 can search the ledger 122 for the specific block or transaction containing the smart contract. Once the correct block is located, protection system 110 can extract the smart contract code from the ledger. For example, the code can be stored within the blockchain data structure, embedded in a transaction or block. The retrieved smart contract can be executed by protection system 110 to enforce the control structure, validating and recording the update to the bi-temporal record as dictated by the pre-defined conditions within the smart contract.

For example, the control structure can be executed to verify the authenticity of the request by verifying digital signatures against those stored in the metadata. The control structure can compare the proposed update against the existing cryptographic object to ensure data integrity, utilizing hashing mechanisms to confirm that no unauthorized modifications have occurred since the last update (e.g., using a detection circuit or control structure). The control structure can also assess the temporal validity of the update, ensuring that it is being conducted within the appropriate time frame specified in the operational rules. After validation, the control structure can generate a new cryptographic object representing the updated state of the data element. This cryptographic object can be recorded on the appropriate ledger 122. The bi-temporal record can be updated to include a link to the new cryptographic object, along with the revised metadata, such as the new capture time and any changes to the origin information.

In some implementations, the user computing system 140 (sometimes, depending on the configuration of the user computing system, the user computing system can be referred to herein as an "electronic device," "mobile device," or "mobile electronic device") can be a computing device, personal computer (PC), desktop computer, laptop computer, smartphone, tablet, smart watch, smart sensor, or any other device configured to facilitate receiving, displaying, and interacting with content (e.g., applications, etc.) or data (e.g., transaction data, cryptographic objects, metadata, etc.). For example, user computing system 140 can be a cell phone configured to execute an application to receive and display content and/or actionable elements and to receive user interaction with the content and/or actionable elements. User computing system 140 can also include an input/output circuit for communicating data over network 130.

In some implementations, the user computing system(s) 140 can include an application. The user computing system 140 can include a plurality of applications. In some implementations, the user computing system(s) 140 can execute an application (e.g., web browser, etc.) to link or synchronize data elements, transactions, and/or accounts between the protection system 110 and various data sources 160 on behalf of one or more users. For example, the application can be configured to retrieve content from other computing systems and devices over the network 130 for displaying transaction and/or account information to a user with the user computing system 140. Additionally or alternatively, the application can be a mobile application executed by the user computing system 140. The application can be a mobile application, such as a mobile banking application, which can be downloaded from an app store, pre-installed, or hard coded into the device's memory.

In the example shown, the application can provided and at least partly supported by the provider institution associated with the protection system 110. Thus, the application can be referred to as a provider application or provider mobile application. As mentioned herein, the provider institution can provide various financial products, goods, and/or services. As such, the provider institution mobile application can provide various financial tools, such as transaction management, stock trades, home loan payments and creation, account monitoring, funds transfer, bill payments, and financial planning tools, etc. In some implementations, the provider institution mobile application can be a part of a mobile banking application associated with the provider institution or a separate application.

In some implementations, the provider institution mobile application can include a collection of software development tools contained in a package (e.g., software development kit (SDK), application programming interface (API), integrated development environment (IDE), debugger, etc.). For example, the provider institution mobile application can include an application programming interface (API) or a debugger, or an SDK that includes an API, a debugger, an IDE, and so on. In some implementations, the provider institution mobile application includes one or more libraries having functions that interface with a particular system software (e.g., iOS, Android, Linux, etc.). As a further example, the provider institution mobile application can include a function configured to collect and report data (e.g., transaction data, cryptographic objects, metadata, device analytics, etc.), and a user can insert the function into the instructions of the provider institution mobile application to cause the function to be called during specific actions of the provider institution mobile application (e.g., in response to identifying a transaction).

The provider mobile application can be installed and designed to run on smartphones, tablets, and other mobile devices. The provider mobile application can include a client-side application that interacts with server-side components over the network. The mobile application can be implemented using various programming languages and frameworks, such as Swift or Objective-C for iOS, and Kotlin or Java for Android. The provider mobile application can be packaged and distributed through app stores. In some implementations, the provider mobile application can include a presentation layer (UI/UX), a business logic layer, and a data layer. The presentation layer can handle user interactions and displays data using graphical user interface components. The business logic layer can process user inputs, manages application workflows, and enforces rules and policies. The data layer can manage data storage, retrieval, and synchronization with remote servers. The provider mobile application can utilize device capabilities such as cameras, GPS, accelerometers, and touchscreens. The provider mobile application can operate in online or offline modes, utilizing local storage and caching mechanisms to facilitate functionality when network connectivity is limited. Security measures, such as encryption, authentication, and secure communication protocols, can be implemented to protect user data and ensure privacy.

In some implementations, the user computing system 140 and the application can be configured to provide one or more interfaces (e.g., graphical user interfaces (GUIs)). For example, the provider mobile application can generate and provide the following interfaces: an exchange interface for accessing, viewing, and/or updating transactions corresponding or involving a user (the protection system 110 can identify transactions involving the user by examining transaction history associated with the user to identify the transactions); an account GUI(s) for accessing, viewing, or updating an account corresponding to the user at the provider; and (among potentially others), a record GUI for accessing, viewing, or updating records associated with data elements. For example, the exchange interface can display a history of all recent transactions (e.g., in a table format for a past predefined amount of time) for the user to access, view, and/or modify transactions associated with a user's provider account. As described herein, the record interface can depict a summary of accumulated records for the user to access, view, and update their data elements associated with different entities. In some implementations, the interfaces can include content items (e.g., for presenting content) and/or actionable elements (e.g., user-selectable or user-interactive features) and be presented via the application.

In some examples, the user computing system 140 can provide an interface (e.g., from the interface system 112 of the protection system 110) on a viewport of the user computing system 140. The viewport refers to a visible area of the graphical user interface through which users can view and interact with user interface content and/or elements. For example, in a mobile application, the viewport displays an initial view of visible content items and/or actionable elements (e.g., menus, forms, data lists, etc.), and users can interact (e.g., scroll or swipe) within the viewport to cause the user computing system 140 to display an updated view with additional content or elements outside the initial view.

The entity computing system(s) 150 can be SORs associated with entities relative to the provider institution associated with the protection system 110. As such, the entities can include regulatory authorities, financial institutions, trading platforms, and/or other entities that can provide data elements associated with exchanges with users but maintained by third-parties relative to the provider institution. In some implementations, the various components of the computing environment 100 can interact with the entity computing system(s) 150 to link various data elements (e.g., transaction records, compliance certificates, financial details) between the provider institution and the entity entities.

For example, the protection system 110 can facilitate the secure management of data elements by providing an interface system 112 to access multiple data sources, such as entity computing systems 150 and/or data sources 160 (e.g., regulatory authority systems). For example, interface system 112 can retrieve data elements from entity computing system (s) 150 through the interface system 112, which processes the data elements (e.g., data element #1, data element #2, data element #3) within the application. Upon successful data retrieval, the entity computing system(s) 150 can provide data elements to the protection system 110 (e.g., via the network 130), which stores and secures these elements using cryptographic methods. Further, a user can view displayed content items and/or interact with input elements (e.g., actionable elements with content) presented on the graphical user interface of the application after accessing or communicating with the entity computing system(s) 150. In some implementations, the protection system 110 can receive data used to update the content items and/or actionable elements via a data communications link (e.g., network 130) between the user computing system 140 and the entity computing system(s) 150, or via a data communications link between the protection system 110 and entity computing system(s) 150.

The protection system 110 can be structured or configured to identify at least one data element associated with an exchange between a user and an entity. For example, the protection system 110 can identify at least one data element received from the entity computing system 150. In some implementations, the protection system 110 can determine that the data element can be part of an exchange involving multiple entities. In response to identifying at least one data element, the protection system 110 can generate cryptographic objects for the data element to ensure its integrity. Further, the protection system 110 can generate one or more actionable elements corresponding to the data element, facilitating the management and verification of the exchange. In some implementations, the protection system 110 can provide the actionable elements to a graphical user interface (GUI) on a mobile device of the user (e.g., user computing system 140). The protection system 110 can receive a selection (e.g., from the user computing system 140 via the network 130) of one or more actionable elements corresponding to a request to verify or manage the data element. In some implementations, the protection system 110 can establish a data communications link (e.g., network 130) with the entity computing system 150. The protection system 110 can further manage the data element and update content of the actionable elements on the GUI to reflect the status of the data element.

Figure 4:
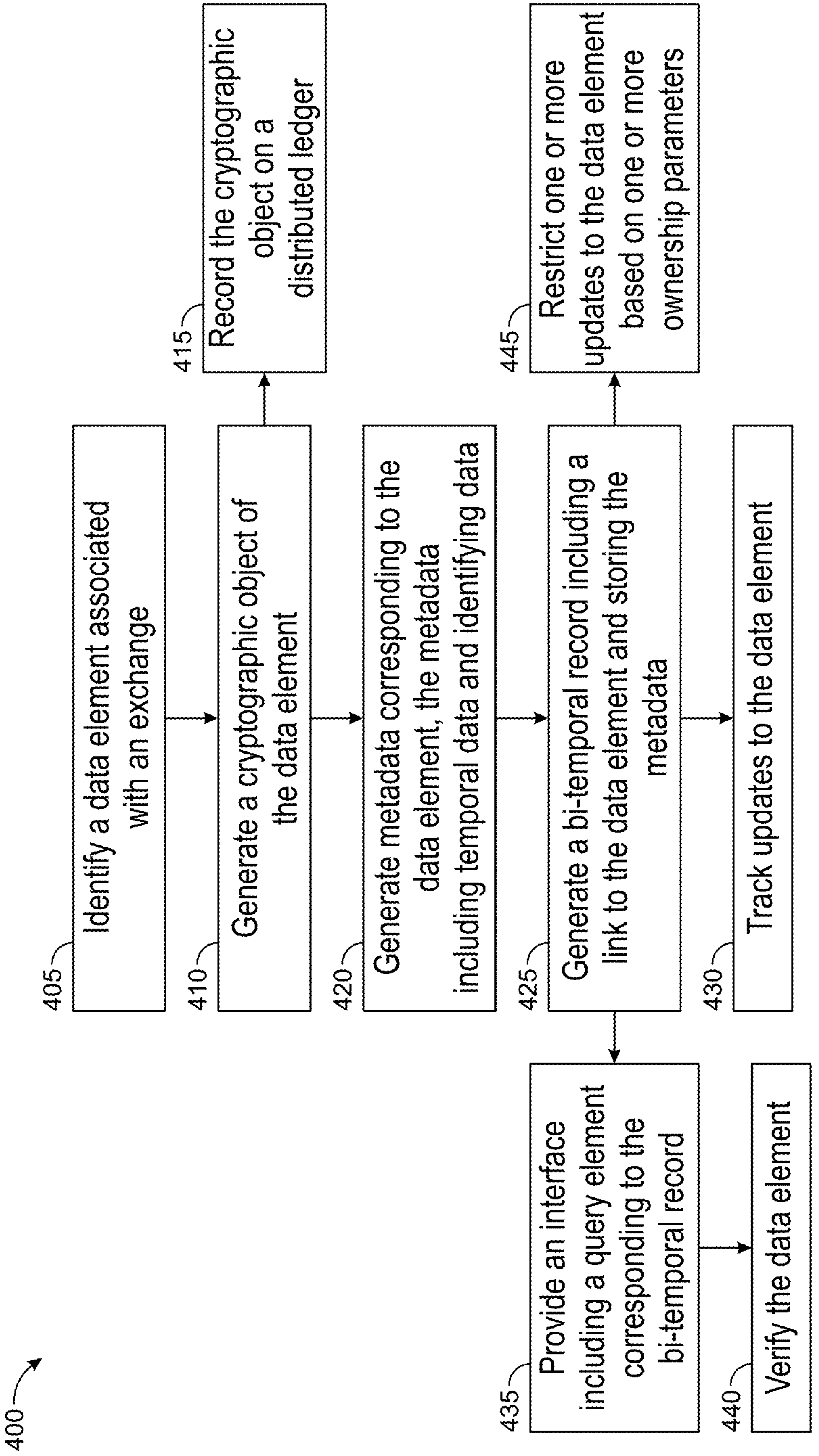
FIG. 4 depicts a method to protect cross-system exchanges, according to some implementations.

As mentioned above, the protection system 110 can further include one or more systems (e.g., interface system 112, cryptography system 114, record system 116, etc.) for synchronizing data elements and exchanges and/or for incorporating the various features and/or functionalities described herein (e.g., for performing one or more steps of method 400 of FIG. 4). The interface system 112 can identify data elements from multiple sources. For example, the interface system 112 can process and prepare data from sources 150*a*, 150*b*, and 150*c*, corresponding to various entities involved in an exchange. The exchange can be a financial transaction involving different entities such as trading platforms, banks, and regulatory authorities. In some implementations, the interface system 112 can aggregate data elements associated with the exchange and identify them for further processing. The cryptography system 114 can generate cryptographic objects for the identified data elements using cryptographic functions such as hashing, digital signatures, or encryption. These cryptographic objects can be stored in a ledger 122, which includes blocks that store transactions. Each block can contain multiple transactions, and the cryptography system 114 can compile and validate these blocks using a consensus algorithm before adding them to one or more ledgers (e.g., ledgers of SOR). The record system 116 can generate a bi-temporal record that includes links to the data elements and stores the corresponding metadata. This bi-temporal record can track changes to the data elements over time, including timestamps of data creation and modification. The record system 116 can also update the bi-temporal record with new cryptographic objects and metadata based on any changes to the data elements. Additionally, the record system 116 can provide a query element for the bi-temporal record, allowing users to verify the data elements and restrict updates based on ownership parameters.

The cryptography system 114 of the protection system 110 can generate one or more cryptographic objects for the identified data elements. For example, the cryptography system 114 can generate a cryptographic object for each data element or a group of data elements using a cryptographic function. The cryptographic function can include hashing, digital signatures, encryption, or any other cryptographic method suitable for securing the data elements. The cryptography system 114 can store the generated cryptographic objects in the ledger 122. The ledger 122 can include blocks that store transactions, where each block can contain multiple transactions. The cryptography system 114 can compile the cryptographic objects and bundle them into a block, then use a consensus algorithm to validate and add the block to the ledger 122. The cryptography system 114 can interact with the ledger 122 using APIs or smart contracts to submit transactions to the ledger through a secure connection. In some implementations, the cryptography system 114 can store the generated cryptographic objects in multiple ledgers 122, with each ledger unique to an SOR. Each ledger 122 can include blocks that store transactions, where each block can contain multiple transactions. For example, block n on ledger 1 can include transaction #1, transaction #2, and transaction #3, while block n on ledger 122 can include different transactions. The cryptography system 114 can compile the cryptographic objects and bundle them into blocks specific to each ledger. For example, the cryptography system 114 can use a consensus algorithm to validate and add the blocks to the respective ledgers 122. The cryptography system 114 can interact with the multiple ledgers 122 using APIs or smart contracts to submit transactions to the ledgers through secure connections.

The record system 116 of the protection system 110 can generate a bi-temporal record including links to the data elements and storing the corresponding metadata. The bi-temporal record can facilitate tracking changes to the data elements over time, including timestamps of data creation and modification. The record system 116 can generate the bi-temporal record by associating each data element with its corresponding metadata and storing the combined information. The record system 116 can track updates to the data elements by updating the bi-temporal record with new cryptographic objects and metadata based on any changes to the data elements. In some implementations, protection system 110 retrieves the relevant smart contract from the ledger 122 to enforce the control structure associated with the update. The record system 116 can further generate a query element for the bi-temporal record to allow users to verify the data elements and restrict updates based on ownership parameters. In some implementations, the protection system 110 can configured to perform method 400 described with reference to FIG. 4.

Referring now to FIG. 2, a depiction of a computer system 200 is shown. The computer system 200 that can be used, for example, to implement a computing environment 100 of FIG. 1, the protection system 110, data system 120, user computing system(s) 140, entity computing system(s) 150, and data sources 160, and/or various other example systems described in the present disclosure. The computing system 200 includes a bus 205 or other communication component for communicating information and a processor 210 coupled to the bus 205 for processing information. The computing system 200 also includes main memory 215, such as a random-access memory (RAM) or other dynamic storage device, coupled to the bus 205 for storing information, and instructions to be executed by the processor 210. Main memory 215 can also be used for storing position information, temporary variables, or other intermediate information during execution of instructions by the processor 210. The computing system 200 can further include a read only memory (ROM) 220 or other static storage device coupled to the bus 205 for storing static information and instructions for the processor 210. A storage device 225, such as a solid-state device, magnetic disk or optical disk, is coupled to the bus 205 for persistently storing information and instructions.

The computing system 200 can be coupled via the bus 205 to a display 235, such as a liquid crystal display, or active matrix display, for displaying information to a user. An input device 230, such as a keyboard including alphanumeric and other keys, can be coupled to the bus 205 for communicating information, and command selections to the processor 210. In another arrangement, the input device 230 has a touch screen display 235. The input device 230 can include any type of biometric sensor, a cursor control, such as a mouse, a trackball, or cursor direction keys, for communicating direction information and command selections to the processor 210 and for controlling cursor movement on the display 235.

In some implementations, the computing system 200 can include a communications adapter 240, such as a networking adapter. Communications adapter 240 can be coupled to bus 205 and can be configured to provide communications with a computing or communications network 130 and/or other computing systems. In various illustrative implementations, any type of networking configuration can be achieved using communications adapter 240, such as wired (e.g., via Ethernet), wireless (e.g., via Wi-Fi, Bluetooth), satellite (e.g., via GPS) pre-configured, ad-hoc, LAN, WAN.

According to various implementations, the processes that effectuate illustrative implementations that are described herein can be achieved by the computing system 200 in response to the processor 210 executing an arrangement of instructions contained in main memory 215. Such instructions can be read into main memory 215 from another computer-readable medium (CRM), such as the storage device 225. Execution of the arrangement of instructions contained in main memory 215 causes the computing system 200 to perform the illustrative processes described herein. One or more processors in a multi-processing arrangement can also be employed to execute the instructions contained in main memory 215. In alternative implementations, hard-wired circuitry can be used in place of or in combination with software instructions to implement illustrative implementations. Thus, implementations are not limited to any specific combination of hardware circuitry and software.

That is, although an example processing system has been described in FIG. 2, implementations of the subject matter and the functional operations described in this specification can be carried out using other types of digital electronic circuitry, or in computer software (e.g., application, blockchain, distributed ledger technology) embodied on a tangible medium, firmware, or hardware, including the structures disclosed in this specification and their structural equivalents, or in combinations of one or more of them. implementations of the subject matter described in this specification can be implemented as one or more computer programs, e.g., one or more subsystems of computer program instructions, encoded on one or more computer storage medium for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

Although shown in the implementations of FIG. 2 as singular, stand-alone devices, one of ordinary skill in the art will appreciate that, in some implementations, the computing system 200 can include virtualized systems and/or system resources. For example, in some implementations, the computing system 200 can be a virtual switch, virtual router, virtual host, virtual server. In various implementations, computing system 200 can share physical storage, hardware, and other resources with other virtual machines. In some implementations, virtual resources of the network can include cloud computing resources such that a virtual resource can rely on distributed processing across more than one physical processor, distributed memory, etc.

Figure 3:
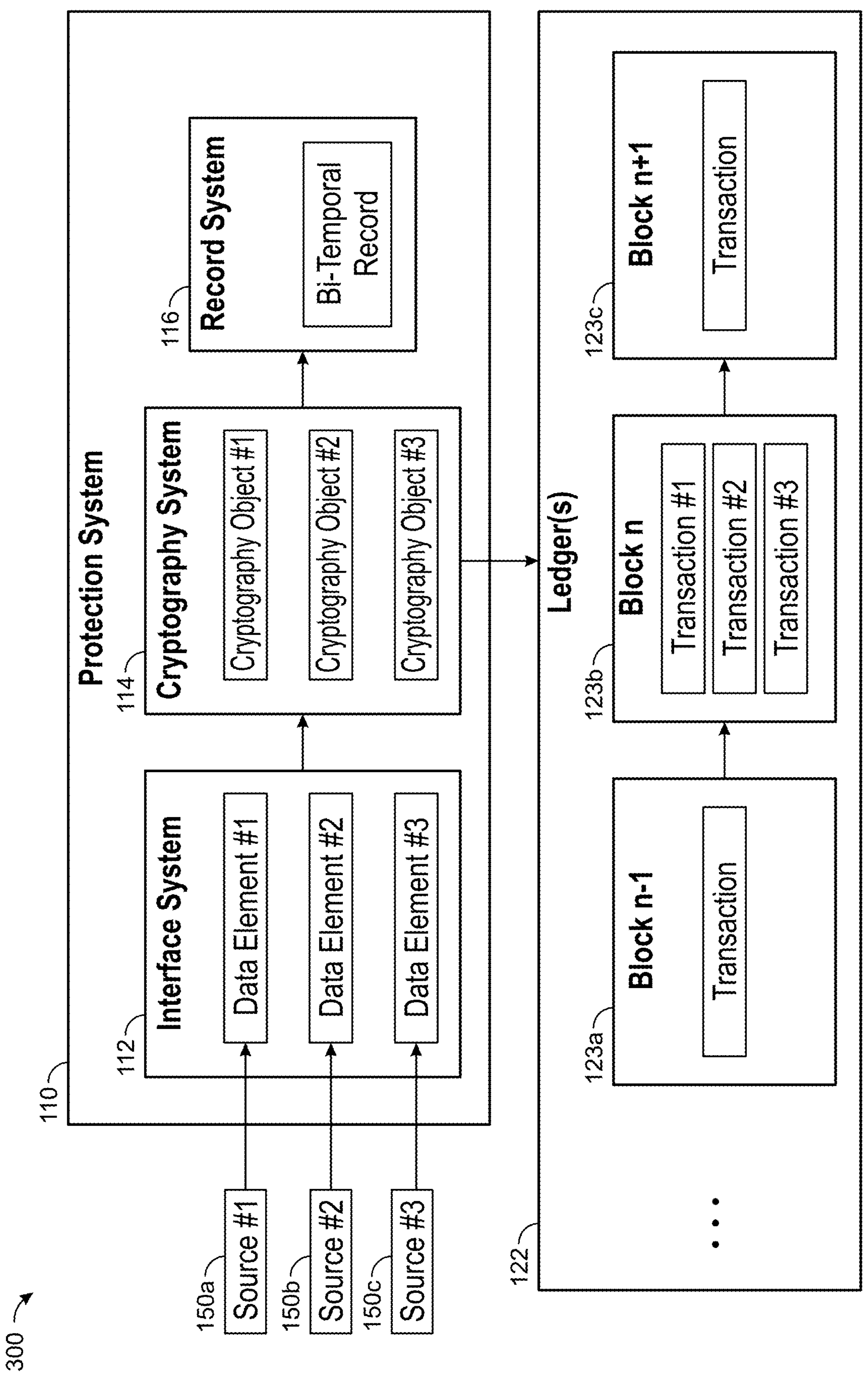
FIG. 3 depicts an example exchange architecture, according to some implementations.

Referring now to FIG. 3, depicting an example exchange architecture 300 configured to secure and manage data elements from multiple sources, according to some implementations. In broad overview, protection system 110 can include an interface system 112, a cryptography system 114, and a record system 116. The interface system 112 can identify data elements from multiple sources. For example, data element #1 can be received from source #1 **150*a*, data element #2 from source #2 150*b*, and data element #3 from source #3 150*c*. In some implementations, the interface system 112 can identify a plurality of data elements associated with an exchange. That is, identifying the data elements can include processing and preparing data from sources 150*a*, 150*b*, and 150*c*. For example, the exchange can be a financial transaction and the source 150*a* can be a trading platform, source 150*b* can be a bank, and source 150*c*** can be a regulatory authority.

In some implementations, the cryptography system 114 can generate cryptographic objects for one or more data elements. That is, cryptographic object #1 can be generated for data element #1, cryptographic object #2 for data element #2, and cryptographic object #3 for data element #3. In some implementations, the cryptography system 114 can store the cryptographic objects in ledger 122. The ledger 122 can include blocks such as block n−1 **123*a*, block n 123*b*, and block n+1 123*c*, which store transactions. Each block can contain multiple transactions. For example, block n 123*b* includes transaction #1, transaction #2, and transaction #3. To create blocks, the cryptography system 114 can compile multiple cryptographic objects and bundle them into a block. For example, the cryptography system 114 can use a consensus algorithm to validate and add the block to the ledger. That is, the ledger 122 can be interacted with by the cryptography system 114 using APIs or smart contracts. For example, the cryptography system 114 can submit transactions to the ledger through a secure connection. In some implementations, the cryptography system 114 can store the cryptographic objects in multiple ledgers 122, each ledger being unique to an SOR. Each ledger 122 can include blocks such as block n−1 123*a*, block n 123*b***, and block n+1

123*c*, which store transactions. Each block can contain multiple transactions. To create blocks, the cryptography system 114 can compile multiple cryptographic objects and bundle them into blocks specific to each ledger. For example, the cryptography system 114 can use a consensus algorithm to validate and add the blocks to the respective ledgers 122. That is, the multiple ledgers 122 can be interacted with by the cryptography system 114 using APIs or smart contracts. For example, the cryptography system 114 can submit transactions to the ledgers through secure connections.

In some implementations, the cryptography system 114 can generate cryptographic objects for each identified data element or a plurality of data elements using a cryptographic function. For example, the processors can use a hashing function to generate a unique hash for each data element or group of data elements. In some implementations, groups of data elements can be aggregated or cryptographically secured in a group such that the integrity of the entire group can be verified with a single hash. For example, the cryptography system 114 can aggregate transaction records into a Merkle tree structure.

In some implementations, the record system 116 can generate a bi-temporal record including a link to one or more data elements and storing the corresponding metadata. That is, the bi-temporal record can facilitate tracking changes to the data elements over time. For example, the bi-temporal record can include timestamps of data creation and modification. In this example, the bi-temporal record can be generated by the record system 116 by associating each data element with its corresponding metadata and storing the combined information. In some implementations, the record system 116 can track updates to the data elements by utilizing a smart contract retrieved from the ledger 122. That is, tracking can include updating the bi-temporal record with new cryptographic objects and metadata based on any changes to the data elements.

Referring now to FIG. 4, depicting a method to protect cross-system exchanges, according to some implementations. At least one of the example system of FIG. 1, or the example exchange architecture 300 of FIG. 3, can perform method 400 according to present implementations.

In broad overview of method 400, at block 405, the one or more processors (e.g., protection system 110, specifically interface system 112) can identify a data element associated with an exchange. At block 410, the one or more processors (e.g., cryptography system 114) can generate a cryptographic object of the data element. At block 415, the one or more processors (e.g., record system 116) can record the cryptographic object on a distributed ledger. At block 420, the one or more processors (e.g., cryptography system 114) can generate metadata corresponding to the data element, the metadata including temporal data and identifying data. At block 425, the one or more processors (e.g., record system 116) can generate a bi-temporal record including (i) a link to the data element and (ii) storing the metadata. At block 430, the one or more processors (e.g., record system 116) can track updates to the data element. At block 435, the one or more processors (e.g., interface system 112) can provide an interface including a query element corresponding to the bi-temporal record. At block 440, the one or more processors (e.g., interface system 112) can verify the data element. At block 445, the one or more processors (e.g., cryptography system 114) can restrict one or more updates to the data element based on one or more ownership parameters.

In some implementations, additional, fewer, or different operations can be performed in method 400 depending on the particular implementation. In some implementations, some, or all operations of method 400 can be performed by one or more processors executing on one or more computing devices, systems, or servers. In various implementations, at least one operation can be re-ordered, added, removed, or repeated. Additionally, some or all of the operations performed by the blocks can be removed or added.

In broad overview, method 400 relates to the protection of cross-system exchanges by reconciling data elements across disparate systems of records. By synchronizing transaction timestamps and validity lifespan parameters, method 400 improves the integrity and consistency of data across multiple platforms. This can also be referred to as data harmonization. Utilizing distributed ledger technology (DLT), method 400 can facilitate the management of exchanges either through DLT or a consolidated record. This can facilitate secure and efficient synchronization. Additionally, method 400 can define criteria for exchange data and generate cryptographic hashes (or other cryptographic functions or secure functions) of the exchange components. In some implementations, method 400 can include the transfer of these hashed transaction data to a ledger, facilitating the reassembly of exchanges securely. In some implementations, method 400 can also implement a real-time synchronization mechanism in the data harmonization process. Additionally, method 400 can establish protocols for clients to satisfy conditions across multiple systems of record. In some implementations, a smart contract or another automated mechanism can be employed to reconcile the data with other ledgers, providing consistent cross-system data exchange.

At block 405, the processors (e.g., interface system 112) can identify a plurality of data elements associated with an exchange across a plurality of data sources corresponding to a plurality of entities. For example, the processors can identify a data element associated with an exchange from a data source corresponding to an entity. In some implementations, the data elements can be individual pieces of data related to various aspects of a transaction (or exchange). Additionally, the data sources can be systems of record (SOR) (e.g., provider systems, financial databases, regulatory records, trading platforms, audit logs). That is, identifying the data elements can include the processors querying and extracting information from these sources. For example, the processors can retrieve transaction details from a financial database and compliance records from a regulatory database. After identifying the data elements, the processors can generate or identify an existing smart contract stored on one or more ledgers that can enforce updates, changes, or tracking of the identified data elements. The smart contract can be used to ensure that any modifications or transactions of the data elements adhere to predefined rules, thus maintaining the integrity and accuracy of the exchange across all relevant SORs.

In some implementations, at least one of the plurality of data elements can correspond to one or more controllable electronic records (e.g., digital signatures, encrypted transaction details, compliance certificates) representing a portion (e.g., risk, compliance, financial details, or transaction specifics) of the exchange. That is, controllable electronic records can be verifiable, secure, and associated with specific transactions. For example, a controllable electronic record can be a digital signature verifying the authenticity of a trade. In another example, a controllable electronic record can be an encrypted document containing the financial specifics of a transaction. In some implementations, the one or more controllable electronic records are stored in a distributed database (e.g., records 124 in data system 120). For example, the processors can store digital signatures in a blockchain-based ledger. In another example, the processors can store encrypted transaction details in a secure cloud storage.

For example, a data element can be a risk metric identifying data points capturing the risk associated with an exchange. In this example, the risk metric can be a quantitative assessment of the potential financial exposure. In another example, a data element can be compliance data required for regulatory reporting and to ensure the exchange complies with legal requirements. In this example, the compliance data can be certification that the transaction meets regulatory standards. In yet another example, a data element can be trade execution details that include information about when and how the trade was executed. In this example, the trade execution details can be a log of the transaction execution process. In yet another example, a data element can be one or more timestamps that includes time data indicating when specific events in the exchange process occurred. In this example, the timestamps can be records of each step in the transaction lifecycle. In yet another example, a data element can be pricing information about the prices involved in the trade. In this example, the pricing information can be the agreed prices at the time of the transaction. In yet another example, a data element can be volume data indicating the number of shares or units traded. In this example, the volume data can be the quantity of assets involved in the exchange. In yet another example, a data element can be party identities identifying the entities involved in the exchange (e.g., buyer, seller). In this example, the party identities can be the unique identifiers of the participants in the trade. In yet another example, a data element can be reference trade data that can change over time and affect the transaction. In this example, the reference trade data can be historical data influencing current trade decisions.

At block 410, the processors (e.g., cryptography system 114) can generate a first plurality of cryptographic objects of one or more of the plurality of data elements. For example, the processors can generate a first cryptographic object of the data element, the first cryptographic object corresponding to a first identifier representing a first state of the data element at a first capture time. That is, the first plurality of cryptographic objects can correspond to a first identifier representing a first state of one or more of the plurality of data elements at a first capture time. In some implementations, the cryptographic objects can be hashes, digital signatures, encrypted tokens, or any other output of a cryptographic function (e.g., SHA-256, RSA, AES) or secure function (e.g., HMAC, digital certificates, zero-knowledge proofs). For example, the processors can create hashes to represent the initial state of the data elements at a specific point in time, referred to as the first capture time. Additionally, while hashes are used and described herein, it should be understood that the processors can generate cryptographic objects using other cryptographic methods to generate hash alternatives such as digital signatures or encrypted tokens. In some implementations, the cryptographic objects can be a combination of hashes, digital signatures, encrypted tokens, or digital certificates. Additionally, the point of capture time can be the specific time when the data element was initially captured or generated. That is, the point of capture time can be considered a specific instance within the valid time or the transaction time.

In some implementations, the hashes, digital signatures, or encrypted tokens can be used to ensure any change to the data element can be detected because any alteration in the data would result in a different hash and/or different digital signature. That is, the processors can generate the cryptographic objects by applying cryptographic functions to the data elements. For example, the processors can use a hashing algorithm to generate a unique hash for each data element. In another example, in a stock trade system, at least one data element (e.g., such as trade execution details, pricing information, or risk metrics) can be hashed at the moment the trade can be executed. For instance, the hash for the trade execution details can be generated to represent the state of those details at the exact time of the trade. In this instance, if the trade execution details include the stock symbol, quantity, price, and timestamp, this information can be processed through a cryptographic algorithm to produce a unique hash and/or digital signature. Thus, the hash can then be used to verify the integrity of the trade details, ensuring they have not been altered since the time of execution. Additionally, while a stock trade system is described, it should be understood that the method can be applied to other types of transactions. For example, the method can be applied to real estate transactions, supply chain transactions, cross-border payments, digital identity verifications, or any scenario requiring secure and verifiable data integrity At block 415, the processors (e.g., cryptography system 114) can record at least one of the first plurality of cryptographic objects on a distributed ledger (e.g., in ledger 122 of data system 120). For example, the processors can record the first cryptographic object on a distributed ledger. In some implementations, after generating the cryptographic hashes for the trade execution details, pricing information, and risk metrics in a stock trade system, the hashes can be recorded on a blockchain (e.g., Ethereum, Hyperledger, Bitcoin, or any other distributed ledger technology). That is, the distributed ledger can include a blockchain and be configured to record the first plurality of cryptographic objects of the plurality of data elements on the blockchain. For instance, the hash, digital signature, and/or encrypted token representing the state of the trade execution details can be added to a block in the blockchain. That is, adding to a blockchain can be facilitated by appending the cryptographic objects to a new block that can then added to the existing chain of blocks. Additionally, the distributed ledger can be configured to record at least one control structure (e.g., smart contract, executable code module, authorization protocol, validation routine, or any executable code designed to enforce specific conditions). That is, the control structure can restrict and/or enforce updates to data elements by validating ownership and temporal criteria before allowing modifications. For example, restricting can include preventing unauthorized entities from altering data elements outside the predefined validity time. In this example, the smart contract can enforce the temporal and ownership constraints to ensure that only authorized updates occur within the allowed time frame. Furthermore, the blockchain can be a public blockchain or private and/or semi-private blockchain. To record the cryptographic objects on a public blockchain the processors can broadcast the data to the network for validation and inclusion in a block. To record the cryptographic objects on a private and/or semi-private blockchain the processors can use a permissioned network where access can controlled by a central authority or a consortium of entities. In some implementations, the cryptographic objects can be packaged into a data structure for storage on the distributed ledger.

For example, packaging can include combining the cryptographic objects into a Merkle tree structure for verification. In some implementations, instead of packaging, the processors can directly append each cryptographic object to the blockchain. For example, the processors can create individual transactions for each cryptographic object and record them on the ledger. In some implementations, the processors (e.g., cryptography system 114) can record at least one of the first plurality of cryptographic objects on distributed ledgers (e.g., in multiple ledgers 122 of data system 120, each associated with an SOR). For example, the processors can record the first cryptographic object on a distributed ledger unique to a specific SOR. In some implementations, after generating the cryptographic hashes for the trade execution details, pricing information, and risk metrics in a stock trade system, the hashes can be recorded on separate blockchains associated with each SOR. That is, the distributed ledger system can include multiple blockchains, each configured to record the first plurality of cryptographic objects of the plurality of data elements on the blockchain specific to an SOR. For instance, the hash, digital signature, and/or encrypted token representing the state of the trade execution details can be added to a block in the appropriate blockchain.

In some implementations, the recordation can occur before, after, or in parallel with block 420 (e.g., generating metadata). In some implementations, recording can include the processors creating a record of the cryptographic objects in the distributed ledgers. That is, the distributed ledger can be communicated with by sending transactions to the network nodes. In some implementations, recording can include the processors recording the cryptographic objects in a data source (e.g., data sources 160). That is, the data source can be communicated with by establishing a secure connection and transmitting the data. For example, the processors can use RESTful APIs to send the cryptographic objects to a cloud-based storage service.

At block 420, the processors (e.g., cryptography system 114) can generate metadata corresponding to at least one of the plurality of data elements. For example, the processors can generate metadata corresponding to the data element, the metadata including temporal data indicating the first capture time and identifying data including origin information of the data source. In some implementations, the metadata can include temporal data such as the first capture time corresponding to when at least one of the plurality of data elements was captured and identifying data including origin information of the plurality of data sources. That is, generating the metadata can include extracting information about the data elements and recording it in a structured format. For example, the processors can generate metadata that includes timestamps and source identifiers for each data element. Additionally, the first capture time can be timestamps of the initial creation or logging of the data elements and the identifiers can identify the SORs that originally stored or processed the data elements.

In some implementations, the temporal data can indicate the time (e.g., timestamps, datetime) when the data element was first captured (e.g., the first capture time). Additionally, the identifying data provides information about the origin or source of the data, such as which system or entity recorded it. That is, the metadata can be used by the processors to track the provenance and context of at least one data element. For example, in a stock trade system, for at least one recorded trade, metadata can be generated by the processors to include the timestamp when the trade was executed (e.g., Jan. 1, 2024, at 10:00 AM) and details about where the data came from, such as the trading platform (e.g., NYSE trading system) or regulatory body.

In some implementations, the metadata can be stored with the data element, facilitating the tracing of the trade details back to the source and verifying the validity. For example, the data elements can be stored in records 124 of data system 120. In some implementations, the records can be indexed by unique identifiers to facilitate retrieval. That is, the metadata can be stored with the data elements by embedding the metadata within the same database entries (described in detail with reference to block 425). For example, the processors can include the metadata in the same record as the corresponding data element in a relational database. Additionally, for instance, if a regulatory body desires to audit the trade, the regulatory body can use the metadata to confirm the exact time and source of the trade details, ensuring regulatory requirements. In this instance, using the metadata can include a regulatory body system accessing the records 124 and retrieving the metadata and associated data elements for verification.

At block 425, the processors (e.g., record system 116) can generate a bi-temporal record including (i) a plurality of links to the plurality of data elements and (ii) storing the corresponding metadata. For example, the processors can generate or update a bi-temporal record including a link to the data element and storing the corresponding metadata, the bi-temporal record corresponding to an exchange time and a validity time for the data element. Generally, the bi-temporal record can be a data structure that maintains historical and current states of the data elements, or any record-keeping method that captures changes over time. In some implementations, the generation of the bi-temporal record can include the processors creating a version-controlled log of data element states and their associated metadata. That is, the generation of the bi-temporal record can facilitate the creation of links to data elements and storing of the metadata (e.g., to be associated with or correspond to the data elements). For example, the processors can link each data element to its corresponding metadata and store the links in a blockchain or version control system. In some implementations, the links can be unique identifiers or pointers to the data elements' storage locations. For example, a link can be a Uniform Resource Identifier (URI) or access locations that point to the location of a data element in a cloud storage service, and the corresponding data element can be the actual stored data. In this example, the linking can occur by the processors generating and associating the URIs with the data elements during the metadata generation process.

In some implementations, the bi-temporal record can correspond to an exchange time and a validity time for at least one of the plurality of data elements. For example, the exchange or transaction time can be when the data was recorded (e.g., on the distributed ledger) or entered into the protection system 110 (e.g., financial transaction systems, compliance tracking systems, audit logs). In this example, the time can represent when the transaction occurred in the system's timeline (e.g., date and time of trade execution). In another example, the validity time can be a time period during which the data (e.g., transaction details, compliance status, risk metrics) can considered valid in the real world. In this example, the validity time can represent the time frame during which the data can applicable or relevant to the real-world event it describes (e.g., validity period of a compliance certificate). Thus, the exchange time can be the recorded timestamp of the transaction, and the validity time can be the period during which the transaction details are considered accurate and applicable.

In some implementations, the bi-temporal record can log at least one data change's timestamp and the specific periods the data can accurate and valid in real-world contexts. For example, for a stock trade, the processors can record when the trade was initially entered into the system (e.g., trade execution timestamp), when any updates or modifications to the trade were made (e.g., timestamp of compliance update), and/or the periods during which the original and updated trade details were considered valid (e.g., validity periods of risk assessments and compliance updates). Thus, the bi-temporal record can allow users to track the entire history of the trade, including initial execution details, subsequent changes such as risk assessments or compliance updates, and the exact time frames at least one set of details applied.

Referring to blocks 430, 435, 440, and 445 generally, the processors can execute a sequence of operations to maintain the integrity and security of the data elements. At block 430, the processors can track updates to the data elements by continuously monitoring for changes and updating the bi-temporal record using at least one smart contract. At block 435, the processors can provide an interface that includes a query element, allowing users to access and review the bi-temporal record and associated data elements. At block 440, the processors can verify the data elements by comparing the current cryptographic objects with the stored cryptographic objects, ensuring consistency and detecting any unauthorized changes. At block 445, the processors can restrict updates to the data elements based on predefined ownership parameters, enforcing access controls and validation procedures to ensure that authorized entities can make modifications. This sequence of operations can verify that the data elements remain secure, accurate, and trustworthy across multiple systems and entities involved in transactions such as trades, loan finalizations, and other cross-system exchanges. Generally, smart contracts or other control structures (e.g., decision trees, rule-based engines) stored on one or more ledgers across the SORs can be used to automate validation and enforcement of updates. For example, the bi-temporal record can be updated with a new cryptographic object by using a smart contract that automatically checks compliance against predefined criteria. In this example, a smart contract can be identified by the processors by querying the ledger for a contract associated with the specific data element or transaction type. Additionally, once the smart contract is identified, the processors can execute it to apply the necessary updates to the bi-temporal record and verify that all conditions are met before any changes are finalized. That is, the use of smart contracts in protection system 110 ensures that bi-temporal or uni-temporal records across different ledgers remain immutable and time-sensitive. The smart contracts can be used to enforce conditions for updates, preserving the integrity and chronological accuracy of the records.

At block 430, the processors (e.g., record system 116) can track updates to the plurality of data elements based on updating the bi-temporal record, using at least one control structure, with one or more new cryptographic objects and/or new metadata based on an update to at least one of the plurality of data elements of the exchange. That is, using a control structure can include executing a smart contract to automatically update the bi-temporal record with new cryptographic objects and metadata once the data change is validated. Additionally, each SOR can include smart contracts that can be stored on ledgers (e.g., blockchains) and configured to enforce these updates. For example, the processors can track updates to the data element based on updating the bi-temporal record with a new cryptographic object and new metadata based on an update to the data element. That is, tracking can include the processors monitoring the data elements for changes and recording any modifications in the bi-temporal record. To update the bi-temporal record, the processors can generate new cryptographic objects and metadata using the smart contract reflecting the current state of the data elements. For example, the smart contract can automatically execute to validate the data change and then update the bi-temporal record with the corresponding cryptographic objects and metadata. In some implementations, tracking can include the processors monitoring changes to the data elements by updating the bi-temporal record when one or more data elements are modified. For example, the processor can detect a change in a trade detail and in turn, update the bi-temporal record to reflect the new state of the data element. In some implementations, the bi-temporal record can be stored in a distributed database (e.g., records 124 of data system 120). For example, the processors can store updated bi-temporal records in a blockchain ledger. In another example, the processors can store bi-temporal records in a version-controlled database.

Additionally, the bi-temporal record can be updated with new cryptographic objects and/or new metadata based on an update to at least one of the plurality of data elements of the exchange. That is, the update to at least one of the plurality of data elements of the exchange can be identified by the processors by monitoring the data sources for changes, querying the systems of record, or receiving update notifications. For example, an update to the data element of the exchange can be a modification to the trade execution details. In this example, the processors can detect the update and generate a new cryptographic object to represent the modified trade details. In another example, an update to the data element of the exchange can be a compliance status change. In this example, the processors can detect the compliance update and generate new metadata to reflect the change. That is, data elements can be updated at any time by authorized systems, regulatory bodies, trading platforms, or any entity involved in the exchange. In some implementations, when updates occur, the processors can track these updates by updating the bi-temporal record with (i) one or more new cryptographic objects and/or (ii) new metadata. Thus, tracking includes creating an audit trail of changes to the data elements.

The smart contract can enforce temporality by validating updates against predefined rules stored within the contract. When an update to a data element is proposed, the smart contract can be used to check the current state against the recorded state within the bi-temporal record. For example, the smart contract can compare the proposed update with the exchange time and validity time parameters to ensure the changes align with the expected temporal sequence. If the update meets these criteria, the smart contract can generate new cryptographic objects and/or metadata to reflect the change.

In some implementations, when a data element can updated, the processors can generate a new cryptographic function output (sometimes referred to as "cryptographic outputs," e.g., hash, digital signature, encrypted token) that represents the current state of the data element after the change. In some implementations, the smart contract can enforce temporality across ledgers (and SORs) by validating the update against the exchange time and validity time parameters defined in the contract. For example, the new metadata can be created by the smart contract after confirming that the update meets the temporal criteria (e.g., the validity time is within the acceptable range, the exchange time has not expired, the transaction is still active, the update occurs within a permissible time window, the data source is verified, the update does not violate any time-sensitive conditions, the current time aligns with the predefined schedule). Additionally, the processor can execute a cryptographic function such as a hashing algorithm, digital signature algorithm, encryption algorithm, that can output a unique identifier for the updated state. For example, the cryptographic function output can be represented as a hash that can be stored on the ledger. In another example, the cryptographic function output can be represented as a digital signature that can be used for verification. In some implementations, the processors can record the cryptographic function output on a distributed ledger. For example, similar to block 415, the processors can create a new transaction containing the cryptographic output and add it to the blockchain.

Additionally, new metadata can be created to reflect the update, including details such as the time of the update and/or the source of the change. In some implementations, when a data element can updated, the processors can generate new metadata (e.g., update timestamp, updated by, reason for update) that represents the change. That is, the smart contract can enforce temporality across ledgers (and SORs) by automatically generating and recording new metadata after validating the update. For example, the new metadata can be created by the smart contract after confirming that the update meets the temporal criteria (e.g., the validity time is still active, the update is within the allowable modification period, the transaction time has not passed a predefined threshold, the record is still within the audit window, the system clock aligns with the ledger time, the change is authorized within the current period, the update fits within regulatory time constraints). Additionally, the processor can generate new metadata by extracting relevant information about the update and structuring it in a predefined format. For example, the new metadata can be a timestamp indicating when the update occurred. In another example, the new metadata can include the identity of the entity that made the update. In some implementations, the processors can record the new metadata in records 124 of data system 120. For example, similar to block 420, the processors can add the new metadata to the existing bi-temporal record. The bi-temporal record can then be updated by the processors with the new cryptographic outputs and metadata.

For example, when a financial institution updates the risk assessment data associated with a trade transaction, the smart contract (e.g., executed by the processors) can retrieve the current state of the data element, including its cryptographic object, from the ledger tied to the original system of record (SOR). The smart contract can then generates a new cryptographic object for the updated risk assessment data. The exchange time and validity time parameters can be checked against the criteria embedded in the smart contract. If the parameters meet the criteria, the smart contract records the new cryptographic object and updates the bi-temporal record with the relevant metadata, such as the update timestamp and the entity making the change. This update can then be propagated across all linked ledgers. That is, the linked ledgers can validate the new cryptographic object and synchronize their respective records accordingly. For example, if a linked ledger attempted to reject the update due to a discrepancy in the cryptographic object, the smart contract could enforce the correction or halt further propagation until consistency is restored.

At blocks 435 and 440, the processors (e.g., interface system 112) can provide an interface including a query element corresponding to the bi-temporal record (block 435). For example, the processors can provide an interface including a query element corresponding to the bi-temporal record, the query element configured to, responsive to receiving an interaction, verify the data element. In some implementations, the query element can be configured to, responsive to receiving an interaction, verify the plurality of data elements (block 440). For example, when a user interacts with one or more query elements, such as by selecting a specific data element to check or submitting a verification request, the processors can retrieve the original cryptographic hashes (or other cryptographic output) and/or the latest updated hashes (or other cryptographic output) from the distributed ledger (or database). The processors can then generate a new set of cryptographic hashes for the current state of the data elements at the present capture time. By comparing the new hashes with the retrieved hashes (or comparing cryptographic outputs), the processors can verify if the data elements have remained consistent and unchanged since they were last recorded.

In some implementations, the interface can be a web-based application, a mobile app, or a desktop software. For example, the interface can include a graphical user interface (GUI) configured to display the plurality of data elements, corresponding metadata, and the bi-temporal record. Additionally, the interface can include search and filter elements facilitating a sorting of the plurality of data elements based on provided criteria (e.g., capture times, data source identifiers, and ownership history). For example, a search of one or more data elements can include entering specific keywords or criteria in a search bar. For example, a filter of one or more data elements can include selecting specific categories or date ranges from a filter menu. That is, corresponding metadata can include details of the data elements (e.g., timestamps, source identifiers) and a visual representation (e.g., bi-temporal record) can be displayed by the interface.

In some implementations, the processors can generate the interface or update an application to present the interface by implementing custom software or using existing software frameworks. For example, to generate and provide the interface, the processors can develop a web application using HTML, CSS, and JavaScript. In another example, to update the application to provide the interface, the processors can integrate new features or functionalities into an existing system and/or application. In some implementations, the query elements can be buttons, text fields, drop-down menus, or any actionable elements that can be interacted with. For example, the query element can be a search bar and can correspond to a data element (e.g., bi-temporal record). In another example, the query element can be a filter menu and can correspond to a specific category of data elements (e.g., bi-temporal record). That is, the bi-temporal record can be queried using the interface. Thus, the query element can facilitate user interactions with the bi-temporal record.

In some implementations, verifying the data elements using the at least one control structure can include processors (i) retrieving the first plurality of cryptographic objects or the one or more new cryptographic objects from the distributed ledger, (ii) generating a second plurality of cryptographic objects corresponding to a second identifier representing a second state of at least one of the plurality of data elements at a second capture time, and (iii) verifying the first state of plurality of cryptographic objects or a new state of the one or more new cryptographic objects corresponds to the second state of second plurality of cryptographic objects. For example, the processors can (i) retrieve the new cryptographic object corresponding to a new identifier from the distributed ledger, (ii) generate a second cryptographic object corresponding to a second identifier representing a second state of the data element at a second capture time, and (iii) verify a new state of the new cryptographic object corresponds to the second state of the second cryptographic object. Generally, the smart contract (e.g., control structure) can be used to enforce the validation process across the ledgers. That is, the smart contract can retrieve cryptographic objects, generate new cryptographic objects, and verify states to ensure data integrity. For example, retrieving can include the smart contract querying the distributed ledger for the latest cryptographic object associated with the data element. In another example, generating the cryptographic object can include the smart contract executing a cryptographic function to create a new hash based on the updated data element. In yet another example, verifying the states can include the smart contract comparing the newly generated cryptographic object against the expected state to confirm the update's validity.

In some implementations, retrieving the first plurality of cryptographic objects and/or one or more new cryptographic objects can include the smart contracts (e.g., processors) querying the distributed ledger for the stored cryptographic objects. That is, the cryptographic objects and/or new cryptographic objects can be stored on the distributed ledger such that they are accessible for verification purposes. For example, blocks of the distributed ledger can store the cryptographic objects by appending them to the blockchain. The blocks can be communicated with and/or interfaced with by the processors using blockchain APIs. For example, the smart contracts can retrieve the cryptographic objects by sending a query to the blockchain network. In another example, the smart contracts can retrieve the cryptographic objects by accessing a distributed ledger explorer tool. In some implementations, the new cryptographic objects can be stored in a newer block and/or sidechain such that the smart contracts can access the latest state of the data elements. Additionally, verifying data elements can include retrieving new and original cryptographic objects (e.g., created when the data elements were first recorded and updated). For example, the verification process can involve comparing the original and updated cryptographic objects to verify data integrity.

In some implementations, retrieving the first plurality of cryptographic objects can include the smart contracts accessing the distributed ledger using secure communications. That is, the cryptographic objects can be stored on the distributed ledger such that they are protected from unauthorized access. For example, blocks of the distributed ledger can store the cryptographic objects by encoding them into transactions. The blocks can be communicated with and/or interfaced with by the smart contracts using secure APIs or smart contracts. For example, the smart contracts can retrieve the cryptographic objects by authenticating with a blockchain wallet. In another example, the smart contracts can retrieve the cryptographic objects by executing a smart contract query.

In some implementations, generating the second plurality of cryptographic objects corresponding to a second identifier representing a second state of one or more of the plurality of data elements at a second capture time can include the smart contracts using cryptographic algorithms. That is, the second cryptographic objects can be generated using a cryptographic function. For example, the smart contracts can use SHA-256 to generate a hash of the updated data elements. Additionally, a second identifier can be, but is not limited to, a unique hash value, a digital signature, a token, an encryption key, a checksum, a timestamp, or any other data object that can represent a state of data elements at capture times. In some implementations, the second state can be the updated condition of the data elements. That is, the data elements can include a state such as, but not limited to, initial state, modified state, verified state, invalid state, or any state change resulting from an update. Additionally, the second capture time can be the timestamp of the data elements at the moment of the update. For example, the data element can be a transaction record, can have an initial state with a second capture time of the update. In this example, the state and second capture time of the data elements can be recorded in the bi-temporal record.

In some implementations, verifying the first state of plurality of cryptographic objects or a new state of the one or more new cryptographic objects corresponds to the second state of second plurality of cryptographic objects can include the smart contracts comparing the cryptographic objects. That is, states can correspond when the cryptographic objects match or when the comparison indicates no changes. For example, a first or new state of a first hash can be identical to a second state of a second hash when the second hash can generated from the same data. In this example, the smart contracts can verify by performing a hash comparison operation. In another example, a first or new state of a first hash can differ from a second state of a second hash when the second hash can generated from altered data. In this example, the smart contracts can invalidate or un-verify by detecting the discrepancy. In some implementations, corresponding states can represent the integrity and consistency of the data elements. Additionally, verifying states correspond can include checking the cryptographic objects against stored values. For example, states correspond when the current cryptographic object matches the stored hash. In another example, states correspond when the digital signature can verified against the public key.

In some implementations, when verifying, the smart contracts can identify, using at least one control structure, and/or detect an unauthorized update to the plurality of data elements based on comparing the first plurality of cryptographic objects with either (i) the second plurality of cryptographic objects or (ii) the third plurality of cryptographic objects. That is, the smart contract can restrict an update to a data element by identifying an unauthorized update by detecting a mismatch in the expected cryptographic outputs. For example, the smart contract can compare the hash of the current state of a data element against the expected hash stored on the ledger. In this example, the smart contract can flag the update as unauthorized if the hashes do not match, preventing further changes. Generally, the unauthorized update can be identified by the smart contract when the cryptographic objects do not align with the established validation parameters, such as hash discrepancies or invalid digital signatures. Additionally, the processors executing the smart contract can trigger an alert or rollback action upon detecting an unauthorized update. For example, the comparison between the first plurality of cryptographic objects and the second plurality of cryptographic objects can include the smart contracts using hash comparison algorithms (e.g., SHA-256, MD5). In another example, the comparison between the first plurality of cryptographic objects and the third plurality of cryptographic objects can include the smart contracts using digital signature verification methods (e.g., RSA, DSA). That is, the unauthorized update can be any modification detected by the discrepancy between the compared cryptographic objects and by using specific techniques such as HMAC-based integrity checks, Merkle tree verification, blockchain consensus protocols, or cryptographic proof validation.

At block 445, the processors (e.g., cryptography system 114) can restrict, using at least one control structure, one or more updates to the plurality of data elements based on one or more ownership parameters. That is, the smart contracts (e.g., executed by the processors) can include executable code that can enforce the ownership rules and validate the identity of the entity attempting to make the update. For example, the smart contract can restrict updates by checking the permissions associated with the entity's digital signature before allowing any modification. In this example, when the update is across multiple SORs, the smart contract can ensure that only authorized entities with the correct permissions can execute the update. In some implementations, the ownership parameters can be a set of permissions and conditions under which each entity (e.g., financial institutions, loan providers, trading platforms, regulatory bodies, auditors) involved in the transaction is allowed to update the data elements. The permissions (or rules or parameters) can be defined by the processor's or system's governance policies. The conditions can be specific to each type of entity involved. For example, one set of permissions can include read-only access, write access, administrative privileges, audit rights, validation capabilities, and approval rights. In another example, another set of permissions can include restricted access, conditional write access, supervisory privileges, review rights, authentication capabilities, and compliance verification rights.

When referenced to the smart contracts performing an action or function described herein, it should be understood that the smart contract is executed by the processors in response to predefined triggers or conditions being met (e.g., data element update, transaction completion, ownership validation, compliance check, time-based trigger, external system request, error detection, risk assessment, or any other specified event). That is, the processors can identify or obtain the smart contract from a ledger by querying the ledger for a smart contract associated with the specific data element or transaction context (e.g., data element ID, transaction type, system of record, ownership parameters, validity period, compliance status). For example, the smart contract can be retrieved based on a unique identifier such as a transaction ID or cryptographic hash. Additionally, the processors can execute or employ the smart contract by loading it into an execution environment where the conditions and logic encoded within the contract are applied to the data elements. For example, the smart contract can enforce validation rules, update records, or trigger subsequent actions in other systems. As shown, the smart contract can maintain temporality of the bi-temporal record or uni-temporal record by enforcing time-based conditions and validating the sequence of data modifications.

Additionally, governance policies can be security protocols, validation procedures, or access control mechanisms. The governance policies can include one or more verification processes to confirm the credentials of the entity and the current ownership state before allowing any modification. The policies can ensure that authorized entities can make changes to the data elements. For example, a governance policy can include multi-factor authentication to add an extra layer of security for entities attempting to modify records. Another governance policy can include role-based access control to limit modifications based on the user's role within the organization. Additionally, audit logging and monitoring can be implemented to track all changes and verify transparency and accountability in data handling.

In some implementations, at least one of the entities involved in the transaction can be permitted to update the plurality of data elements in response to satisfying one or more ownership parameters (e.g., user authentication, role verification, compliance check, audit trail). For example, a financial institution (e.g., entity) can satisfy an authentication parameter by providing valid credentials such as digital certificates or authentication tokens. In another example, a regulatory body (e.g., entity) can satisfy a compliance parameter by submitting documentation that verifies regulatory adherence. Restricting one or more updates can include enforcing the ownership parameters based on verifying one or more credentials of the entities and/or a current ownership state (e.g., access permissions, entity roles, regulatory compliance) before allowing the updates to at least one of the data elements. The smart contracts (e.g., executed by the processors) can enforce access control policies by validating user roles and permissions before permitting updates. Additionally, compliance verification procedures can be enforced to ensure that all updates meet the legal and regulatory standards, thereby maintaining the integrity and security of the data elements across systems.

Still referring to method 400, in some implementations, in response to (or responsive to) recording at least one of the first plurality of cryptographic objects on the distributed ledger, the processors can reconcile, using at least one control structure, at least one of the plurality of data elements across the plurality of data sources based on (i) retrieving the first plurality of cryptographic objects from the distributed ledger, (ii) generating a third plurality of cryptographic objects corresponding to a third identifier representing a third state of at least one of the plurality of data elements at a third capture time, and (iii) verifying the first state of plurality of cryptographic objects corresponds to the third state of the third plurality of cryptographic objects. Generally, the smart contracts can reconcile by ensuring consistency between the stored cryptographic objects and the current state of the data elements. That is, the temporality can be maintained by the smart contracts such that any changes or updates to the data elements are validated against the original cryptographic objects, preserving the integrity of the record over time. For example, to retrieve, generate, and verify, the smart contract (or another control structure) can execute predefined validation steps, such as comparing timestamps and cryptographic outputs to ensure the update complies with the system's temporal constraints. In this example, the smart contract can include executable code (e.g., executed by the processors) to perform these validation and reconciliation tasks automatically. In some implementations, the smart contracts can retrieve by querying the distributed ledger for the stored cryptographic objects. For example, the first plurality of cryptographic objects can be the initial hashes and the smart contracts can retrieve the objects by sending a request to the blockchain network. In another example, the first plurality of cryptographic objects can be the original digital signatures and the smart contracts can retrieve the objects by accessing the distributed ledger explorer. That is, retrieving can include accessing the stored cryptographic objects for verification.

In some implementations, the smart contracts can generate the third cryptographic objects by applying a cryptographic hash function to the updated data elements. For example, the third identifier can represent a unique hash value (e.g., third state) of a transaction record (e.g., at least one of the plurality of data elements) at the time of the update (e.g., third capture time). In another example, the third identifier can represent a digital signature (e.g., third state) of a compliance report (e.g., at least one of the plurality of data elements) at the time the report was finalized (e.g., third capture time). That is, generating can include applying a cryptographic function such as SHA-256, RSA, or another cryptographic algorithm.

In some implementations, the smart contracts can verify the first state corresponds to the third state by comparing the cryptographic objects. For example, the first state can be the initial hash of the data element and the third state can be the updated hash. In this example, the states can correspond when the hashes match. In this example, the plurality of cryptographic objects can be the original set of hashes and the plurality of third cryptographic objects can be the new set of hashes. In another example, the first state can be the original digital signature of the data element and the third state can be the new digital signature. In this example, the states can correspond when the digital signatures verify against the public key (e.g., RSA, ECDSA—where verifying against the public key can include using the corresponding public key to decrypt the signature and compare it to the original data hash). In this example, the plurality of cryptographic objects can be the initial set of digital signatures and the plurality of third cryptographic objects can be the updated set of digital signatures. That is, verifying can include verifying that the cryptographic objects match and that the data elements have not been tampered with.

In some implementations, the processors can generate an updated cryptographic object of a data element of the plurality of data elements based on an update. Additionally, the updated cryptographic object can represent an updated state of the data element at a subsequent capture time. For example, the updated state can be a new version of the transaction details and the subsequent capture time can be the timestamp of the update. In another example, the updated state can be the modified compliance status and the subsequent capture time can be the time the modification was recorded. In some implementations, the generating of the updated cryptographic object can include applying a cryptographic function such as a hash, digital signature, or encryption to the updated data element. That is, a cryptographic function such as a hash, digital signature, encryption, or tokenization can be used by the processors to create the updated cryptographic object. Additionally, the processors can record the updated cryptographic object on the distributed ledger. For example, recording can include creating a new transaction on the blockchain with the updated cryptographic object. In some implementations, the processors can link the updated cryptographic object to an access location of a data source of the plurality of data sources. For example, the access location can be a URI pointing to the updated data element. In this example, the access location can be to a cloud storage service (e.g., a data source). That is, an access location can be a specific storage address, and the processors can link the cryptographic object to an access location by embedding the URI in the blockchain transaction.

In some implementations, when the processors generate the updated cryptographic object, the processors can apply at least one validation parameter (e.g., consistency check, integrity validation, compliance verification) of a plurality of validation parameters to determine an integrity (e.g., data consistency, accuracy, completeness) of the update to the data element. That is, a smart contract or another control structure can be accessed or obtained from a ledger and apply the validation parameters to verify that the update adheres to predefined rules and standards. Additionally, the smart contract can execute the validation checks, such as comparing the updated cryptographic object with existing records to ensure that no unauthorized changes have been made. For example, a validation parameter can be a checksum comparison (e.g., MD5 or SHA-256—whereby checksum comparison can be performed by calculating the hash of the original data, such as "e3b0c44 . . . 26855" for SHA-256, and comparing it to the hash of the received data to ensure they match). In this example, the processors can use the validation parameter to ensure the update has not altered the integrity of the data element. That is, the integrity of the update can represent the unchanged nature of the data element. In some implementations, the at least one validation parameter can include one or more rules (e.g., data validation rules, business logic rules, compliance rules) or conditions (e.g., required fields, format checks, logical consistency) to permit updating. That is, the processors can enforce the permission to update by checking the validation parameters against the updated data elements.

In some implementations, the processors can verify the updated cryptographic object satisfies the at least one validation parameter before recording it on the distributed ledger and updating the bi-temporal record. That is, verifying can include the processors performing a validation check. For example, the processors can compare the updated cryptographic object against the validation parameters, such as ownership parameters and validity time constraints. In this example, the validation parameter can be a checksum, which can be used to restrict either recording or updating if the validation fails. In some implementations, the processors can update, using the at least one control structure, the bi-temporal record to include a new link (e.g., URI, UUID, hash pointer, blockchain transaction ID, and/or any other unique identifier) to the data element, including the update and corresponding metadata of the data element. That is, the smart contract can validate the update against the predefined temporal and ownership conditions before allowing the bi-temporal record to be modified. For example, temporality of the bi-temporal record can be maintained by the smart contract by enforcing the validity time and ownership criteria, ensuring that updates are only made by authorized entities within the specified temporal constraints. In this example, the smart contract ensures that the update is only accepted if it occurs within the specified ownership and validity time constraints, thereby preserving the integrity of the bi-temporal record. Additionally, the update can reflect the updated state and the subsequent capture time of the data element. For example, the state can change from initial to updated. In this example, the original capture time can be the time of the first recording, and the subsequent capture time can be the time of the update. In this example, the smart contract can generate a new cryptographic object and metadata reflecting the updated state, ownership validation, and validity time compliance, and store it on the appropriate ledger. In another example, the state can change from compliant to non-compliant. In this example, the original capture time can be the time of initial compliance, and the subsequent capture time can be the time of the compliance status change. In this example, the smart contract can trigger an alert or action based on the compliance status change and record the new state, ownership information, and validity time data on the ledger. That is, the processors can update the bi-temporal record by appending the new state, ownership validation, and time information.

In some implementations, the processors can track the exchange based on maintaining an exchange record (e.g., transaction log, audit trail, history record) of one or more updates to the plurality of data elements. That is, the exchange record can include a plurality of capture times, a plurality of data source identifiers, and a plurality of ownership information. For example, an exchange record can be a log of all or some transactions. In another example, an exchange record can be an audit trail of changes. In yet another example, the exchange record can be a history of all or some of the data element updates. That is, the processors can maintain the exchange record by continuously and/or automatically logging information about the updates.

In some implementations, the processors can provide an exchange log (e.g., transaction log, audit report, change history) of the exchange (e.g., financial transaction, data exchange, compliance update). The exchange log can include ownership history and the one or more updates for at least one of the plurality of data elements at the plurality of capture times. For example, an exchange log can be a chronological record of all changes. In another example, an exchange log can be a report of ownership changes. In yet another example, the exchange log can be a comprehensive history of all updates. That is, the processors can provide the exchange log by generating reports or visual representations to stakeholders, auditors, or regulatory bodies.

The data sources 160 can include external platforms or services that provide real-time or near-real-time data for the operation of protection system 110. These data sources can provide a variety of data elements, such as transaction records, compliance certificates, financial details, regulatory updates, and market indices. Data sources 160 can be integrated through APIs that facilitate secure data retrieval. For example, data sources 160 can supply transaction records from trading platforms, regulatory compliance updates from government databases, and financial details from banking institutions. The protection system 110 can use this data to generate cryptographic objects, update bi-temporal records, and track changes to data elements over time. Additionally, the data sources 160 can provide historical data for back-testing and analysis purposes. In some implementations, the data sources 160 can support both push and pull data retrieval mechanisms, facilitating continuous updates to the protection system 110. Data integrity and accuracy can be maintained by continuously monitoring and validating the data sources 160.

Referring generally to the cryptographic objects stored on the ledger 122, the cryptographic objects can represent various types of information, such as transaction records, compliance certificates, financial details, and other relevant data elements. Each cryptographic object can be associated with metadata that includes specific information, such as timestamps and source identifiers. In some implementations, a cryptographic object or group of cryptographic objects can be recorded in a data block within the blockchain of the ledger 122 (e.g., on-chain). The block can include transaction data related to the cryptographic objects, such as their creation, modification, and validation records. The cryptography system 114 can generate cryptographic objects for each data element using cryptographic functions like hashing, digital signatures, or encryption. These cryptographic objects are stored on the blockchain of the ledger 122 and ensure the integrity and security of the data elements they represent.

In some implementations, the ledger 122 can track the ownership and changes to the cryptographic objects over time. That is, the ledger 122 can facilitate tracking updates and modifications to the cryptographic objects associated with the data elements. For example, when a data element is updated, a new cryptographic object can be generated to reflect this change, and both the updated cryptographic object and its metadata are recorded on the ledger 122. This process ensures that any changes to the data elements are securely documented and verifiable through their associated cryptographic objects. The architecture improves security and efficiency by ensuring data integrity and facilitating secure cross-system exchanges. In some implementations, cross-ledger exchanges or transactions can occur. Cross-ledger exchanges involve transferring data or validation information between different blockchains or ledgers. For instance, a cross-ledger exchange can be facilitated by protocols or bridge services that use secure data sharing and transaction completion. Additionally, external services or oracles can be used to fetch and verify data (e.g., off-chain) from one ledger to another. For example, an external service can be used by the ledger 122 to validate conditions that affect transactions, such as confirming the integrity of data elements for use in cross-system exchanges. In some implementations, the multiple ledgers 122 can track the ownership and changes to the cryptographic objects over time. That is, each ledger 122, being unique to an SOR, can facilitate tracking updates and modifications to the cryptographic objects associated with the data elements. For example, when a data element is updated, a new cryptographic object can be generated to reflect this change, and both the updated cryptographic object and its metadata are recorded on the specific ledger 122. In some implementations, cross-ledger exchanges or transactions can occur. Cross-ledger exchanges involve transferring data or validation information between different blockchains or ledgers associated with different SORs.

The implementations described herein have been described with reference to drawings. The drawings illustrate certain details of specific implementations that implement the systems, methods and programs described herein. However, describing the implementations with drawings should not be construed as imposing on the disclosure any limitations that can be present in the drawings.

It should be understood that no claim element herein is to be construed under the provisions of 35 U.S.C. § 112(f), unless the element is expressly recited using the phrase "means for."

As used herein, the term "circuit" can include hardware structured to execute the functions described herein. In some implementations, each respective "circuit" can include software for configuring the hardware to execute the functions described herein. The circuit can be embodied as one or more circuitry components including, but not limited to, processing circuitry, network interfaces, peripheral devices, input devices, output devices, sensors, etc. In some implementations, a circuit can take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" can include any type of component for accomplishing or facilitating achievement of the operations described herein. For example, a circuit as described herein can include one or more transistors, logic gates (e.g., NAND, AND, NOR, OR, XOR, NOT, XNOR), resistors, multiplexers, registers, capacitors, inductors, diodes, wiring, and so on.

Accordingly, the "circuit" can also include one or more processors communicatively coupled to one or more memory or memory devices. In this regard, the one or more processors can execute instructions stored in the memory or can execute instructions otherwise accessible to the one or more processors. In some implementations, the one or more processors can be embodied in various ways. The one or more processors can be constructed in a manner sufficient to perform at least the operations described herein. In some implementations, the one or more processors can be shared by multiple circuits (e.g., circuit A and circuit B can include or otherwise share the same processor which, in some example implementations, can execute instructions stored, or otherwise accessed, via different areas of memory). Alternatively or additionally, the one or more processors can be structured to perform or otherwise execute certain operations independent of one or more co-processors. In other example implementations, two or more processors can be coupled via a bus to enable independent, parallel, pipelined, or multi-threaded instruction execution. Each processor can be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors can take the form of a single core processor, multi-core processor (e.g., a dual core processor, triple core processor, quad core processor), microprocessor, etc. In some implementations, the one or more processors can be external to the apparatus, for example the one or more processors can be a remote processor (e.g., a cloud based processor). Alternatively or additionally, the one or more processors can be internal and/or local to the apparatus. In this regard, a given circuit or components thereof can be disposed locally (e.g., as part of a local server, a local computing system) or remotely (e.g., as part of a remote server such as a cloud based server). To that end, a "circuit" as described herein can include components that are distributed across one or more locations.

An exemplary system for implementing the overall system or portions of the implementations might include a general purpose computing devices in the form of computers, including a processing unit, a system memory, and a system bus that couples various system components including the system memory to the processing unit. Each memory device can include non-transient volatile storage media, non-volatile storage media, non-transitory storage media (e.g., one or more volatile and/or non-volatile memories), etc. In some implementations, the non-volatile media can take the form of ROM, flash memory (e.g., flash memory such as NAND, 3D NAND, NOR, 3D NOR), EEPROM, MRAM, magnetic storage, hard discs, optical discs, etc. In other implementations, the volatile storage media can take the form of RAM, TRAM, ZRAM, etc. Combinations of the above are also included within the scope of machine-readable media. In this regard, machine-executable instructions include, for example, instructions and data which cause a general purpose computer, special purpose computer, or special purpose processing machines to perform a certain function or group of functions. Each respective memory device can be operable to maintain or otherwise store information relating to the operations performed by one or more associated circuits, including processor instructions and related data (e.g., database components, object code components, script components), in accordance with the example implementations described herein.

It should also be noted that the term "input devices," as described herein, can include any type of input device including, but not limited to, a keyboard, a keypad, a mouse, joystick or other input devices performing a similar function. Comparatively, the term "output device," as described herein, can include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein can show a specific order and composition of method steps, it is understood that the order of these steps can differ from what is depicted. For example, two or more steps can be performed concurrently or with partial concurrence. Also, some method steps that are performed as discrete steps can be combined, steps being performed as a combined step can be separated into discrete steps, the sequence of certain processes can be reversed or otherwise varied, and the nature or number of discrete processes can be altered or varied. The order or sequence of any element or apparatus can be varied or substituted according to alternative implementations. Accordingly, some or all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure can be accomplished with standard programming techniques with rule-based logic and other logic to accomplish the various database searching steps, correlation steps, comparison steps and decision steps.

The foregoing description of implementations has been presented for purposes of illustration and description. It is not intended to be exhaustive or to limit the disclosure to the precise form disclosed, and modifications and variations are possible in light of the above teachings or can be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes and omissions can be made in the design, operating conditions and embodiment of the implementations without departing from the scope of the present disclosure as expressed in the appended claims.

What is claimed is:

1. A system, comprising:

a data processing system comprising one or more processing circuits comprising one or more processors and one or more memory devices, the data processing system configured to:

identify a plurality of data elements associated with an exchange across a plurality of data sources corresponding to a plurality of entities;

generate, using at least one cryptographic function or secure function, a first plurality of cryptographic objects of at least one of the plurality of data elements, at least one of the first plurality of cryptographic objects corresponding to a first identifier representing a first state of at least one of the plurality of data elements at a first capture time;

record at least one of the first plurality of cryptographic objects on a distributed ledger;

generate metadata corresponding to at least one of the plurality of data elements, the metadata comprising temporal data comprising the first capture time corresponding to when at least one of the plurality of data elements was captured, and identifying data comprising origin information of the plurality of data sources;

generate a bi-temporal record comprising a plurality of links to the plurality of data elements and storing the metadata, corresponding to the at least one of the plurality of data alements, the bi-temporal record corresponding to an exchange time and a validity time for at least one of the plurality of data elements;

track updates to the plurality of data elements based on updating the bi-temporal record, using at least one control structure, with one or more new cryptographic objects and new metadata based on an update to at least one of the plurality of data elements of the exchange;

in response to detecting the update to the at least one of the plurality of data elements of the exchange, apply at least one validation parameter to the update;

in response to the update satisfying the at least one validation parameter, update the bi-temporal record with a new cryptographic object and metadata corresponding to an updated state of the at least one of the plurality of data elements; and provide an interface comprising a query element corresponding to the bi-temporal record, the query element configured to, responsive to receiving an interaction, verify the plurality of data elements using the at least one control structure based on:

retrieving the first plurality of cryptographic objects or the one or more new cryptographic objects from the distributed ledger;

generating, using the at least one cryptographic function or secure function, a second plurality of cryptographic objects corresponding to a second identifier representing a second state of at least one of the plurality of data elements at a second capture time; and verifying the first state of plurality of cryptographic objects or a new state of the one or more new cryptographic objects corresponds to the second state of the second plurality of cryptographic objects;

wherein the at least one cryptographic function or secure function comprises at least one of a hashing function, a digital signature function, an encryption function, a proof function, or a certificate function.

2. The system of claim 1, wherein in response to recording at least one of the first plurality of cryptographic objects on the distributed ledger, the one or more processing circuits are further configured to:

reconcile, using the at least one control structure, at least one of the plurality of data elements across the plurality of data sources based on:

retrieving the first plurality of cryptographic objects from the distributed ledger;

generating a third plurality of cryptographic objects corresponding to a third identifier representing a third state of at least one of the plurality of data elements at a third capture time; and verifying the first state of the plurality of cryptographic objects corresponds to the third state of the third plurality of cryptographic objects.

3. The system of claim 2, further comprising:

the distributed ledger comprising a blockchain and configured to record the at least one control structure and the first plurality of cryptographic objects of the plurality of data elements on the blockchain, wherein the at least one control structure restricts updates to the plurality of data elements; and a detection circuit configured to identify, using the at least one control structure, an unauthorized update to the plurality of data elements based on comparing the first plurality of cryptographic objects with either (i) the second plurality of cryptographic objects or (ii) the third plurality of cryptographic objects.

4. The system of claim 1, wherein the one or more processing circuits are further configured to:

restrict, using the at least one control structure, one or more updates to the plurality of data elements based on one or more ownership parameters, wherein at least one of the plurality of entities are permitted to update the plurality of data elements in response to satisfying the one or more ownership parameters; and wherein restricting the one or more updates comprises enforcing the one or more ownership parameters based on verifying one or more credentials of the plurality of entities and a current ownership state before allowing the one or more updates to at least one of the plurality of data elements.

5. The system of claim 1, wherein the one or more processing circuits are further configured to:

generate an updated cryptographic object of a data element of the plurality of data elements based on an update, the updated cryptographic object representing an updated state of the data element at a subsequent capture time;

record the updated cryptographic object on the distributed ledger; and link the updated cryptographic object to an access location of a data source of the plurality of data sources.

6. The system of claim 5, wherein generating the updated cryptographic object comprises:

applying at least one validation parameter of a plurality of validation parameters to determine an integrity of the update to the data element, the at least one validation parameter comprising one or more rules or conditions to permit updating;

verifying the updated cryptographic object satisfies the at least one validation parameter before recording it on the distributed ledger and updating the bi-temporal record; and updating, using the at least one control structure, the bi-temporal record to comprise a new link to the data element comprising the update and corresponding metadata of the data element, reflecting the updated state and the subsequent capture time of the data element.

7. The system of claim 6, wherein the one or more processing circuits are further configured to:

track the exchange based on maintaining an exchange record of one or more updates to the plurality of data elements, the exchange record comprises a plurality of capture times, a plurality of data source identifiers, and a plurality of ownership information; and provide an exchange log of the exchange, comprising ownership history and the one or more updates for at least one of the plurality of data elements at the plurality of capture times.

8. The system of claim 1, wherein at least one of the plurality of data elements corresponds to one or more controllable electronic records representing a portion of the exchange, and wherein the bi-temporal record and the one or more controllable electronic records are stored in a distributed database.

9. The system of claim 1, wherein the interface comprises:
a graphical user interface (GUI) configured to display the plurality of data elements, corresponding metadata, and the bi-temporal record; and
search and filter elements facilitating a sorting of the plurality of data elements based on provided criteria.

10. A method, comprising:
identifying, by one or more processing circuits, a plurality of data elements associated with an exchange across a plurality of data sources corresponding to a plurality of entities;
generating, by the one or more processing circuits using at least one cryptographic function or secure function, a first plurality of cryptographic objects of at least one of the plurality of data elements, at least one of the first plurality of cryptographic objects corresponding to a first identifier representing a first state of at least one of the plurality of data elements at a first capture time;
recording, by the one or more processing circuits, at least one of the first plurality of cryptographic objects on a distributed ledger;
generating, by the one or more processing circuits, metadata corresponding to at least one of the plurality of data elements, the metadata comprising temporal data comprising the first capture time corresponding to when at least one of the plurality of data elements was captured, and identifying data comprising origin information of the plurality of data sources;
generating, by the one or more processing circuits, a bi-temporal record comprising at least one link to the plurality of data elements and storing the metadata corresponding to the at least one of the plurality of data elements;
tracking, by the one or more processing circuits, updates to the plurality of data elements based on updating, using at least one control structure, the bi-temporal record with one or more new cryptographic objects and new metadata based on an update to at least one of the plurality of data elements of the exchange;
in response to detecting the update to the at least one of the plurality of data elements of the exchange, applying at least one validation parameter to the update;
in response to the update satisfying the at least one validation parameter, updating the bi-temporal record with a new cryptographic object and metadata corresponding to an updated state of the at least one of the plurality of data elements; and
providing, by the one or more processing circuits, an interface comprising a query element corresponding to the bi-temporal record, the query element configured to, responsive to receiving an interaction, verify the plurality of data elements using the at least one control structure based on:
retrieving the first plurality of cryptographic objects or the one or more new cryptographic objects from the distributed ledger;
generating, using the at least one cryptographic function or secure function, a second plurality of cryptographic objects corresponding to a second identifier representing a second state of at least one of the plurality of data elements at a second capture time; and
verifying the first state of plurality of cryptographic objects or a new state of the one or more new cryptographic objects corresponds to the second state of the second plurality of cryptographic objects;
wherein the at least one cryptographic function or secure function comprises at least one of a hashing function, a digital signature function, an encryption function, a proof function, or a certificate function.

11. The method of claim 10, wherein in response to recording at least one of the first plurality of cryptographic objects on the distributed ledger, the method further comprising:
reconciling, by the one or more processing circuits using the at least one control structure, at least one of the plurality of data elements across the plurality of data sources based on:
retrieving the first plurality of cryptographic objects from the distributed ledger;
generating a third plurality of cryptographic objects corresponding to a third identifier representing a third state of at least one of the plurality of data elements at a third capture time; and
verifying the first state of the plurality of cryptographic objects corresponds to the third state of the third plurality of cryptographic objects.

12. The method of claim 10, further comprising:
restricting, by the one or more processing circuits using the at least one control structure, one or more updates to the plurality of data elements based on one or more ownership parameters, wherein at least one of the plurality of entities are permitted to update the plurality of data elements in response to satisfying the one or more ownership parameters;
wherein restricting the one or more updates comprises enforcing, by the one or more processing circuits, the one or more ownership parameters based on verifying one or more credentials of the plurality of entities and a current ownership state before allowing the one or more updates to at least one of the plurality of data elements; and
the bi-temporal record corresponds to an exchange time and a validity time for at least one of the plurality of data elements.

13. The method of claim 10, further comprising:
generating, by the one or more processing circuits, an updated cryptographic object of a data element of the plurality of data elements based on an update, the updated cryptographic object representing an updated state of the data element at a subsequent capture time;
recording, by the one or more processing circuits, the updated cryptographic object on the distributed ledger; and
linking, by the one or more processing circuits, the updated cryptographic object to an access location of a data source of the plurality of data sources.

14. The method of claim 13, wherein generating the updated cryptographic object comprises:
applying, by the one or more processing circuits, at least one validation parameter of a plurality of validation parameters to determine an integrity of the update to the data element, the at least one validation parameter comprising one or more rules or conditions to permit updating;

verifying, by the one or more processing circuits, the updated cryptographic object satisfies the at least one validation parameter before recording it on the distributed ledger and updating the bi-temporal record; and updating, by the one or more processing circuits using the at least one control structure, the bi-temporal record to comprise an update link to the data element comprising the update and corresponding metadata of the data element, reflecting the updated state and the subsequent capture time of the data element.

15. The method of claim 13, further comprising:

tracking, by the one or more processing circuits, the exchange based on maintaining an exchange record of one or more updates to the plurality of data elements, the exchange record comprises a plurality of capture times, a plurality of data source identifiers, and a plurality of ownership information; and providing, by the one or more processing circuits, an exchange log of the exchange, comprising ownership history and the one or more updates for at least one of the plurality of data elements at the plurality of capture times.

16. The method of claim 10, wherein at least one of the plurality of data elements corresponds to one or more controllable electronic records representing a portion of the exchange, and wherein the bi-temporal record and the one or more controllable electronic records are stored in a distributed database.

17. The method of claim 10, wherein the interface comprises:

a graphical user interface (GUI) configured to display the plurality of data elements, corresponding metadata, and the bi-temporal record; and search and filter elements facilitating a sorting of the plurality of data elements based on provided criteria.

18. A system, comprising:

a data processing system comprising one or more processing circuits configured to:

identify a data element associated with an exchange from a data source corresponding to an entity;

generate, using at least one cryptographic function or secure function, a first cryptographic object of the data element, the first cryptographic object corresponding to a first identifier representing a first state of the data element at a first capture time;

generate metadata corresponding to the data element, the metadata comprising temporal data indicating the first capture time and identifying data comprising origin information of the data source;

generate or update a bi-temporal record comprising a link to the data element and storing the metadata corresponding to the data element, the bi-temporal record corresponding to an exchange time and a validity time for the data element;

track updates to the data element based on updating, using at least one control structure, the bi-temporal record with a new cryptographic object and new metadata based on an update to the data element;

in response to detecting the update to the data element, apply at least one validation parameter to the update;

in response to the update satisfying the at least one validation parameter, update the bi-temporal record with the new cryptographic object and metadata corresponding to an updated state of the data element; and provide an interface comprising a query element corresponding to the bi-temporal record, the query element configured to, responsive to receiving an interaction, verify the data element using the at least one control structure;

wherein the at least one cryptographic function or secure function comprises at least one of a hashing function, a digital signature function, an encryption function, a proof function, or a certificate function.

19. The system of claim 18, wherein the one or more processing circuits are further configured to:

reconcile, using the at least one control structure, the data element on the data source based on:

retrieving the first cryptographic object from a distributed ledger;

generating a second cryptographic object corresponding to a second identifier representing a second state of the data element at a second capture time; and verifying the first state of cryptographic object corresponds to the second state of the second cryptographic object.

20. The system of claim 19, further comprising:

the distributed ledger comprising a blockchain and configured to record the at least one control structure and the cryptographic object of the data element on the blockchain, wherein the at least one control structure restricts updates to a plurality of data elements; and a detection circuit configured to identify an unauthorized update to the data element based on comparing the first cryptographic object with the second cryptographic object.

* * * * *